(12) United States Patent
Wada

(10) Patent No.: US 6,408,230 B2
(45) Date of Patent: Jun. 18, 2002

(54) OMNIDIRECTIONAL VEHICLE AND METHOD OF CONTROLLING THE SAME

(75) Inventor: Masayoshi Wada, Kanagawa (JP)

(73) Assignee: Fuji Electric Co., Ltd., Kawasaki (JP)

( * ) Notice: Subject to any disclaimer, the term of this patent is extended or adjusted under 35 U.S.C. 154(b) by 53 days.

(21) Appl. No.: 09/759,370

(22) Filed: Jan. 16, 2001

(30) Foreign Application Priority Data

Jan. 17, 2000 (JP) ........................................ 2000-007969

(51) Int. Cl.$^7$ ................................................. B62D 7/08
(52) U.S. Cl. ............................. 701/1; 180/6.2; 180/6.5; 180/252
(58) Field of Search ............................... 701/1, 41, 23; 180/6.2, 6.24, 6.28, 6.48, 6.5, 6.6, 6.62, 252, 253, 263, 264, 265, 402, 408, 411

(56) References Cited

U.S. PATENT DOCUMENTS 4,683,973 A * 8/1987 Honjo et al. ................. 180/252
5,201,818 A * 4/1993 Nishimoto ................... 180/79.1
5,924,512 A    7/1999 Wada

FOREIGN PATENT DOCUMENTS

| EP | 0716974 A1 * | 12/1995 | ............ B62D/7/02 |
| JP | 62-99212 | * 5/1987 | |
| JP | 2000-127776 | 5/2000 | |

* cited by examiner

*Primary Examiner*—William A. Cuchlinski, Jr.
*Assistant Examiner*—Olga Hernandez
(74) *Attorney, Agent, or Firm*—Kanesaka & Takeuchi

(57) ABSTRACT

An omnidirectional vehicle includes a body, and a plurality of units, each unit including a bearing rotatably supporting a steering shaft around a vertical axis with a rotor plate, and a driving wheel axially supported by a supporter fixed to the rotor plate. The driving wheel is positioned at a location spaced apart for a first offset distance from the steering shaft in the rolling direction of the driving wheel and spaced apart for a second offset distance from the steering shaft in the direction perpendicular to the rolling direction of the driving wheel. A first motor is fixed to the body for driving the steering shaft, and a second motor is fixed to the body for rotating the driving wheel. In the holonomic omnidirectional vehicle, the control system and the driving system are simplified, and interference therebetween is prevented. Also, it is possible to reduce the capacities of the actuators, the electric power for driving the vehicle and the manufacturing costs.

13 Claims, 17 Drawing Sheets

OMNIDIRECTIONAL VEHICLE AND METHOD OF CONTROLLING THE SAME

BACKGROUND OF THE INVENTION AND RELATED ART STATEMENT

The present invention relates to an omnidirectional vehicle that exhibits the so-called holonomic moving characteristics. More specifically, the present invention relates to an omnidirectional vehicle that is able to immediately move or start to turn from an arbitrary vehicle position to a desired direction without a waiting time for setup for preparing, for example, the change of orientation of the wheels thereof, in changing the turning speed or moving direction, or in changing from the stop condition to movement or in starting to turn the direction. The vehicle also may change the moving direction or turning direction even during the middle of moving operation. The present invention relates also to a method of controlling the omnidirectional vehicle that exhibits the holonomic moving characteristics.

The omnidirectional vehicle is a vehicle that is capable of controlling three situations freely, i.e. moving or travelling velocity in a moving direction, traveling or travelling velocity perpendicular to the traveling direction, and angular velocity around a vertical axis of the vehicle. Many inventions have been disclosed on the omnidirectional vehicle. The omnidirectional vehicles may be classified into a non-holonomic vehicle and a holonomic vehicle.

It is necessary for the non-holonomic vehicle to conduct a setup operation and a setup time for changing the setup of a part of the mechanisms in the vehicle, such as changing the orientation of each wheel in changing the traveling direction of the vehicle or in shifting to a turning motion. This vehicle has a mechanism that has two free situations. The non-holonomic vehicle is unable to simultaneously control the three free situations of the vehicle independently. The non-holonomic vehicle sets two of the three free situations one by one, and finally, controls the three free situations of the vehicle.

Therefore, the non-holonomic vehicle is unable to trace a trajectory having a right angle corner without spending a setup time. In tracing a right angle corner, the non-holonomic vehicle will trace a circular trajectory if the vehicle does not wait for the setup time. Or, it is necessary for the non-holonomic vehicle to stop at the right angle corner and to resume traveling after the setup time has elapsed. An example of the non-holonomic vehicle is the omnidirectional vehicle that steers all the wheels thereof.

On the other hand, the holonomic vehicle is able to start moving and turning in all the directions instantaneously to an arbitrary orientation from an arbitrary position without changing the setup of the internal mechanisms thereof. The specific feature of the holonomic vehicle is that the holonomic vehicle is capable of simultaneously controlling the three free situations independently. Examples of the holonomic vehicle include an omnidirectional vehicle that employs a spherical wheel, and an omnidirectional vehicle that employs a special wheel mechanism including a large wheel and many rollers arranged around the large wheel and capable of freely rolling laterally.

The holonomic omnidirectional vehicle disclosed by the present inventor in Japanese Patent Unexamined Publication No. 9-164968 includes two or more driving wheel mechanisms, each including an actuator for driving a caster-type wheel and an actuator for driving the steering shaft of the caster-type wheel, to obtain an omnidirectional movement with the three free situations. The wheel mechanism disclosed in the above identified patent publication can use ordinary tires, such as gum tires and pneumatic tires, and obtain a smooth and swift omnidirectional movements.

Since the wheel mechanism disclosed in Japanese Patent Unexamined Publication No. 9-164968 includes the steering shaft that continuously rotates endlessly, the actuator for driving the wheel shaft and the actuator for driving the steering shaft are mounted on a body of the vehicle due to the ease of wiring. Since the rotational movements of the actuators are transmitted via rotating mechanisms such as gears, velocity interference occurs between the actuators.

More in detail, even when the actuator for driving the steering shaft is operated to change the orientation of the wheel while the actuator for driving the wheel is stopped, both the steering shaft and the wheel rotate. In contrast, when the actuator for driving the wheel is operated while the actuator for driving the steering shaft is stopped, only the wheel rotates. Thus, unidirectional velocity interference occurs from the actuator for driving the steering shaft to the actuator for driving the wheel.

To remove the velocity interference described above, it is necessary to conduct a motion control by adding in advance a predetermined rate of the rotating velocity of the steering shaft to the actuator for driving the wheel. In other words, it is necessary to employ an actuator that rotates faster than the maximum rotation frequency necessary only for driving the wheel.

Moreover, it is necessary for the actuator of the steering shaft to generate torque high enough to sustain the torque transmitted to the wheel irrespective of whether the steering shaft is rotating or not, since the torque for driving the wheel acts on the wheel via a fulcrum, that is a certain part, e.g. a gear, of the transmission mechanism of the steering shaft. This means that the torque is exerted suddenly to the steering shaft while the vehicle is accelerating or decelerating or while the vehicle is climbing up or down a step. The torque is nothing but an external turbulence to the actuator for driving the steering shaft.

When an error occurs in the rotating velocity of the steering shaft by the torque from the actuator for driving the wheel, the vehicle deviates from the intended course, further causing a running error of the vehicle. This running error causes a serious problem on the omnidirectional vehicle.

Japanese Patent Unexamined Publication No. 9-164968 also discloses an omnidirectional vehicle including a driving unit having a caster formed of two wheels and an actuator for turning the body of the vehicle. This omnidirectional vehicle controls the translational movement and the rotational movement thereof by controlling three actuators for driving two wheels and for driving the steering shaft of the driving unit. The omnidirectional vehicle avoids the over-restricted state (vehicle is controlled by the actuators more than the number of the actuators for the freedom situations) of the vehicle that employs a plurality of singlewheel-type casters.

Since the actuator for driving the steering shaft is mounted on the driving unit including a caster formed of two wheels, it is necessary to drive the body of the vehicle in the direction opposite to the rotating direction of the driving unit to compensate the orientation change of the driving unit even when the vehicle is not turning, i.e. even when the vehicle is executing a simple translational movement. Therefore, it is necessary for the control calculation in the actuator for controlling the turning of the vehicle to take into account the movements of the vehicle in the direction of the translational movement. This requirement complicates the control system and it becomes necessary to mount an actuator with an extremely high capacity for turning the body of the vehicle.

In short, the interference between a plurality of actuators for driving the vehicle impairs the traveling or moving precision of the vehicle, complicates the control system and increases the capacities of the actuators.

The foregoing problems will be described more in detail below with reference to FIGS. 19 and 20. FIG. 19 is a side view of a conventional caster-type driving wheel mechanism. FIG. 20 is a plan view of the conventional caster-type driving wheel mechanism. The caster-type driving wheel mechanism shown in FIGS. 19 and 20 is a modification of the driving wheel mechanism according to an embodiment disclosed in Japanese Patent Unexamined Publication No. 9-164968.

Referring now to these figures, a bearing 2 rotatably supports a steering shaft 13 around a vertical axis of a body 1 of the vehicle. The steering shaft 13 includes a rotor plate 3. A driving wheel 5 is axially supported by a supporter 4 fixed to the rotor plate 3. The driving wheel 5 is positioned at a location spaced apart for an offset distance s from the center of the rotating axis of the steering shaft 13 in the rolling direction of the driving wheel 5. A motor 10 for driving the steering shaft and a motor 20 for driving the shaft of the driving wheel are mounted on the body 1 of the vehicle and fixed thereto. The motor 10 rotates the steering shaft 13 via a gear 11 on the shaft of the motor 10 and a gear 12 on the steering shaft 13. The motor 20 rotates the driving wheel 5 via a gear 21 on the shaft of the motor 20, spur gears 22, 23, 24, and bevel gears 25, 26.

The driving wheel disclosed in Japanese Patent Unexamined Publication No. 9-164968 generates, as shown in FIG. 21, a velocity in an arbitrary direction in the horizontal plane at the center of the steering shaft, i.e. the center of the rotor plate 3 mounted on the steering shaft 13. That is, the rotation of the driving wheel 5 generates a velocity Vw in the rolling direction thereof. The angular velocity ωs of the circular motion around the ground contact point of the driving wheel 5 caused by the rotation of the steering shaft 13 generates a velocity Vs in the direction perpendicular to the rolling direction of the driving wheel 13. As a result of synthesizing the velocities perpendicular to each other, a velocity V with an arbitrary magnitude in an arbitrary direction is generated at the center of the steering shaft.

When the driving wheel 5 is driven by the motor 20 mounted on the rotor plate 3, the velocity components VS and Vw are controlled independently by the motors 10 and 20, respectively. In the actual wheel design, however, it is required for the steering shaft to continuously rotate multiple times. In most cases, both the motor 20 for driving the shaft of the driving wheel 5 and the motor 10 for driving the steering shaft 13 are mounted on the body of the vehicle due to the wirings that meet the requirement described above. When both the motors 10 and 20 are mounted on the body of the vehicle, the velocity of the motor 10 interferes with the velocity of the motor 20. The interference will be described in detail below.

When the motor 10 is driven to rotate the rotor plate 3 counterclockwise in the plane of a sheet as shown in FIG. 22, the wheel 5 rotates certain degrees of angle by the action of the motor 10 though the motor 20 is not rotating. This corresponds to the state, wherein the gear 23 as well as the motor 20, the gear 21 and the gear 22 are not moving with respect to the body 1 of the vehicle. In other words, the gear 23, the motor 20, the gear 21 and the gear 22 are fixed to the plane of the sheet in FIG. 22.

As the rotor plate 3 rotates, the gear 24 mounted on and fixed to the rotor plate 3 rotates around the gear 23 like a planetary gear. As a result, the gear 24 rotates certain degrees of angle with respect to the rotor plate 3, and the driving wheel 5 rotates certain degrees of angle corresponding the rotation angle of the gear 24. This phenomenon occurs even when the motor 20 for driving the shaft of the driving wheel is rotating. A certain rate of the rotation of the rotor plate 3 is added to the rotation of the driving wheel.

The ratio of the rotation angle of the driving wheel 5 and the rotation angle of the rotor plate 3 takes a certain value determined by the reduction gear ratio of the spur gears 23, 24 and the bevel gears 25, 26. Therefore, the influence of the foregoing velocity interference may be removed by compensating the rotation of the driving wheel 5 caused by the rotation of the rotor plate 3. The rotation of the driving wheel 5 caused by the rotation of the rotor plate 3 is compensated by adding in advance a certain rate of the reference velocity value fed to the motor 10 for driving the steering shaft to the reference velocity value fed to the motor 20 for driving the shaft of the driving wheel.

The countermeasures described above for avoiding the velocity interference are indispensable for the omnidirectional vehicle disclosed in Japanese Patent Unexamined Publication No. 9-164968 to execute the operation as shown in FIG. 21. Therefore, it is necessary for the motor 20 for driving the shaft of the driving wheel 5 to rotate faster than the maximum rotation frequency necessary solely for driving the shaft of the driving wheel, and it is necessary for the motor 20 to have capacity more than necessity.

When a part of the driving wheel 5 contacts the edge of a step while the driving wheel 5 is climbing the step, the motor 20 for driving the shaft of the driving wheel 5 generates large torque to climb up the step. At this moment, however, the driving wheel 5 is locked momentarily and stops rotation until torque large enough to push up the vehicle is transmitted. The torque transmitted to the driving wheel 5 acts on the rotor plate 3 via the spur gears 23 and 24 to rotate the rotor plate 3 and is transmitted further to the motor 10. As a result, an angle error occurs on the rotor plate 3 or, in the worst case, the motor 10 for driving the steering shaft is forced to rotate by the motor 20 for driving the shaft of the driving wheel.

FIG. 23 is a plan view for schematically showing an omnidirectional vehicle according to another embodiment disclosed in Japanese Patent Unexamined Publication No. 9-164968. Referring now to FIG. 23, the omnidirectional vehicle that employs a driving unit including a caster of double-wheel-type facilitates holonomic omnidirectional traveling by three actuators. A motor 150 for driving the steering shaft mounted on a driving unit 55 rotates a body 1 of the vehicle around the driving unit 55. FIG. 24 shows top plan views of the holonomic omnidirectional vehicle of FIG. 23 for explaining the movements thereof. In FIG. 24, the vehicle executes a translational movement in the lateral direction from a state where the driving unit 55 and the body 1 displace from each other by 90 degrees.

Although it is not necessary for the body 1 of the vehicle to change the orientation thereof, the posture of the body 1 changes greatly, since the driving unit 55 operates in the same manner as an ordinary caster. For compensating the influence of the rotation of the driving unit 55, the motor 150 for driving the steering shaft should rotate the body 1 of the vehicle in the opposite direction to keep the body 1 at a certain orientation.

Due to the reason described above, it is required for the motor 150 to generate a maximum velocity that considers the rotation of the driving unit 55, by adding the maximum turning velocity of the driving unit 55 to the maximum turning velocity of the body 1. Since it is necessary to turn the entire driving unit 55, a large driving energy is required. In a vehicle powered by a battery, large electric power is consumed and the running time per one electrification operation is shortened.

In view of the foregoing, it is an object of the invention to provide an omnidirectional vehicle that obviates the foregoing problems.

It is another object of the invention to provide an omnidirectional vehicle as stated above, which can remove the influence of the velocity interference between the actuators for driving the vehicle, simplifies the control system, and minimizes the capacities of the motors for driving the shaft of the driving wheel and for driving the steering shaft.

It is a further object of the invention to provide an omnidirectional vehicle as stated above, which can minimize the capacity of the motor for driving the steering shaft by preventing the external torque turbulence from being transmitted to the motor for driving the steering shaft.

It is a still further object of the invention to provide an omnidirectional vehicle as stated above, which can reduce the dimensions, weight, costs and energy consumption of the vehicle, reduce the dimensions and weight of the battery, and elongate the time of autonomous traveling by the battery.

SUMMARY OF THE INVENTION

According to a first aspect of the invention, there is provided an omnidirectional vehicle comprising: a body; a driving unit fixed to the body and including a steering shaft, a first actuator fixed to the body for driving the steering shaft, a driving wheel including a shaft, and a second actuator fixed to the body for driving the shaft of the driving wheel; a bearing fixed to the body for axially supporting the steering shaft; first power transmitting means for transmitting a power from the first actuator to the steering shaft to drive the steering shaft; a second power transmitting means for transmitting a power from the second actuator to the driving wheel to drive the driving wheel; supporting means positioned below the steering shaft for axially supporting the driving wheel via a bearing to rotate the driving wheel together with the steering shaft around the vertical axis of the body. The driving wheel is positioned at a location spaced apart for a first predetermined distance (d) from a plane including the rotation axis of the steering shaft and extending perpendicular thereto, i.e. parallel to the shaft of the driving wheel, the location being spaced apart for a second predetermined distance (s) from a plane including the rotation axis of the steering shaft to the shaft of the driving wheel to freely rotate the driving wheel around horizontal axes at the orientations. The shaft of the driving wheel and the steering shaft do not cross each other.

Advantageously, the second power transmitting means includes a transmission section A moved by the second actuator around a vertical axis independently of the steering shaft; and a transmission section B linked to the transmission section A and movable around a vertical axis together with the steering shaft. When a reduction gear ratio of the transmission section B is G (deceleration in case G>1) and a radius of the driving wheel is r, the first predetermined distance (d) is expressed by the following equation.

$$d=r/G$$

The configuration described above facilitates avoiding the interference between the operations of the actuator for driving the steering shaft and the actuator for driving the shaft of the driving wheels. Since the driving wheel is offset from the center of the body of the vehicle, the power transmission mechanism is simplified, constructed easily and arranged easily.

Advantageously, the supporting means includes a steering shaft connector connected and fixed to the steering shaft, a gear axially supported by the steering shaft connector, and a support link axially supported on the rotation axis of the gear rotatably in a vertical plane for axially supporting the driving wheel; a transmission section b disposed in substitution for the transmission section B, the transmission section b including a gear for driving the driving wheel and being coupled to the gear supported by the steering shaft connector, the transmission section being movable around a horizontal axis together with the steering shaft; and a vibration absorber between the steering shaft and the support link for absorbing vibrations caused while the driving wheel is running on the ground.

Since the above described configuration allows the driving wheel to always touch the ground even when the ground is not flat, sufficient driving force is obtained, the vehicle is stabilized and the running performance of the vehicle is improved especially when the vehicle includes a plurality of the driving wheel.

Advantageously, the vibration absorber includes a spring; and the vehicle further includes vehicle weight measuring means for measuring the total weight of the vehicle including the load thereof or the center of gravity of the vehicle including the load thereof. The vehicle weight measuring means includes a linear position sensor disposed parallel to the spring and having a potentiometer of linear driving type. The linear position sensor measures the deformation of the spring to measure the vertical reactive force exerted to the driving wheel.

By measuring the deformation of the suspension spring for each driving wheel, the total weight or the center of gravity of the vehicle is estimated and the vehicle is further stabilized.

Advantageously, the vehicle includes a rotatable rod inserted through the center of the steering shaft to move up and down in response to the displacement of the vibration absorber rotating in association with the rotation of the steering shaft; and the vehicle weight measuring means for measuring the total weight of the vehicle including the load thereof or the center of gravity of the vehicle including the load. The vehicle weight measuring means includes the linear position sensor disposed in the portion of the vehicle not rotated by the movement of the steering shaft. The linear position sensor includes a potentiometer of linear driving type for measuring the displacement of the rotatable rod to measure the deformation of the vibration absorber. Since it is possible to dispose the sensor for measuring the deformation of the suspension spring on the body of the vehicle, it becomes unnecessary to arrange the wiring on the rotating portions and the reliability of the measuring system is improved.

According to a second aspect of the invention, there is provided a method of controlling an omnidirectional vehicle including a plurality of the driving units described above. The method includes: defining vehicle-based-coordinates, the origin thereof being set at the reference point of the vehicle; and controlling an angular rotating velocity of the first actuator in each of the plurality of the driving units and an angular rotating velocity of the second actuator in each of the plurality of the driving units based on the following equations relating the position data of the steering shaft on each of the plurality of the driving units on the vehicle-based-coordinates and the orientation data of the plurality of driving units on the vehicle-basedcoordinates.

$$\omega_{mwi}=(Gw/r)\{v_{vx}\cos\theta_{wi}+v_{vy}\sin\theta_{wi}+\omega_v(x_i\sin\theta_{wi}-y_i\cos\theta_{wi})\}$$

$$\omega_{msi}=(Gs/s)\{-v_{vx}\sin\theta_{wi}+v_{vy}\cos\theta_{wi}+\omega_v(x_i\cos\theta_{wi}+y_i\sin\theta_{wi})\}$$

wherein $\omega_{mwi}$ is the angular rotating velocity of the actuator for driving the shaft of the driving wheel of the i-th driving unit;

$\omega_{msi}$ is the angular rotating velocity of the actuator for driving the steering shaft of the i-th driving unit;

$v_{vx}$ is the velocity of the vehicle along the x-axis;

$v_{vy}$ is the velocity of the vehicle along the y-axis;

$\omega_v$ is the angular rotating velocity of the vehicle around the reference point;

r is the radius of the driving wheel;

s is the horizontal distance between the steering shaft and the shaft of the driving wheel in the traveling direction of the driving wheel;

$x_i$ is the x-axis coordinate on the vehicle-based coordinates for the location of the steering shaft in the i-th driving unit;

$y_i$ is the y-axis coordinate on the vehicle-based coordinates for the location of the steering shaft in the i-th driving unit;

$\theta_{wi}$ is the orientation of the driving wheel in the i-th driving unit on the vehicle-based coordinates;

Gs is the reduction gear ratio of the power transmitting means of the actuator for driving the steering shaft; and Gw is the reduction gear ratio of the power transmitting means of the actuator for driving the shaft of the driving wheel.

Since each actuator is controlled completely independently by the method described above without considering the operations of the other driving mechanisms, the mechanism and the software of each driving unit may be summarized into a module more easily, and therefore, the driving unit may be designed mare freely.

According to a third aspect of the invention, there is provided an omnidirectional vehicle comprising: a body; a driving set mounted on the body and including a plurality of driving units, each including a steering shaft and a driving wheel having a shaft; a first actuator for driving the steering shafts of the driving units collectively via first power transmitting means including a belt or a chain; a second actuator for driving the driving wheels of the driving units via second power transmitting means; a bearing mounted on the driving set for supporting the body rotatably around the vertical axis of the vehicle; a third actuator mounted on the driving set for rotating the body around the vertical axis of the vehicle; third power transmitting means mounted on the driving set for transmitting the power from the third actuator; and supporting means positioned below the steering shaft for axially supporting the driving wheel via a bearing. The driving wheel is positioned at a location spaced apart for a first predetermined distance (d) from a plane including the rotation axis of the steering shaft and extending perpendicular thereto and parallel to the shaft of the driving wheel, the location being spaced apart for a second predetermined distance (s) from a plane including the rotation axis of the steering shaft to the shaft of the driving wheel to freely rotate the driving wheel around the horizontal axis. The shaft of the driving wheel and the steering shaft do not cross each other.

According to a fourth aspect of the invention, there is provided a method of controlling the omnidirectional vehicle described above. The method comprises: controlling an angular rotating velocity of the first actuator, an angular rotating velocity of the second actuator, and an angular rotating velocity of the third actuator based on the following equations to control the directions and the velocities of the translational movements of the driving units and the body, and the orientation of the body.

$$\omega_w=(Gw/r)(v_{vx}\cos\theta_w+v_{vy}\sin\theta_w)$$

$$\omega_s=(Gs/s)(-v_{vx}\sin\theta_w+v_{vy}\cos\theta_w)$$

$$\omega_{mr}=Gr\omega_v$$

wherein $v_{vx}$ is the velocity of the vehicle along the x-axis;

$v_{vy}$ is the velocity of the vehicle along the y-axis;

$\omega_v$ is the angular rotating velocity of the vehicle around the reference point;

$\omega_{mw}$ is the angular rotating velocity of the actuator for driving the shafts of the driving wheels;

$\omega_{ms}$ is the angular rotating velocity of the actuator for driving the steering shafts;

$\omega_{mr}$ is the angular rotating velocity of the actuator for driving the turning shaft of the vehicle;

r is the radius of the driving wheel;

s is the horizontal distance between the steering shaft and the driving wheel in the traveling direction of the driving wheel;

$\theta_w$ is the orientation of the driving wheels on the vehicle-based coordinates;

Gs is the reduction gear ratio of the power transmitting means of the actuator for driving the steering shafts;

Gw is the reduction gear ratio of the power transmitting means of the actuator for driving the shafts of the driving wheels; and Gr is the reduction gear ratio of the power transmitting means of the actuator for driving the turning shaft of the vehicle.

By the configuration and the controlling method described above for driving the driving wheels with one single actuator and the steering shafts with one single actuator, the vehicle is driven with a necessary but minimum number of actuators, and the manufacturing costs of the vehicle are reduced. Since the interference of the translational movement and the rotational movement of the vehicle is avoided, the load of the control system and the dimensions of the actuator for turning the vehicle are reduced.

Advantageously, the foregoing $\theta_w$ is measured by angle measuring means including an angle detector fixed to the body of the vehicle. The shaft of the angle detector is rotated by the first power transmitting means of the first actuator for driving the steering shafts.

Advantageously, the angle measuring means includes a first integrating encoder for detecting the rotation of the shaft of the first actuator; a second integrating encoder for detecting the rotation of the shaft of the third actuator; an absolute encoder for detecting the orientation of the driving wheels with respect to the body of the vehicle with a relatively low resolution; and a differential counter for counting a number of pulses contained in a first pulse train from the first integrating encoder and a number of pulses contained in a second pulse train from the second integrating encoder. The first pulse train indicates a normal rotation or a reverse rotation of the first actuator and is inputted to the positive input of the differential counter, and the second pulse train indicates a normal rotation or a reverse rotation of the second actuator and is inputted to the negative input of the differential counter. The differential counter subtracts the number of pulses contained in the second pulse train from the number of pulses contained in the first pulse train, and outputs the result of the subtraction. The angle measuring means uses the output of the differential counter for the lower place bits and the output of the absolute encoder for the upper place bits. The angle measuring means connects the lower place bits and the upper place bits to obtain the measured relative angle value between the orientations of the vehicle and the driving wheel.

In the above described method, the absolute encoder with a relatively low resolution is mounted on one shaft driven by two actuators, and the value from the absolute encoder is corrected by a hardware, i.e. two integrating encoders mounted on the actuators. Thus, the angle detection can be made with a high precision by cheap sensors without increasing the load of the software.

Advantageously, the relative positional relation between the driving wheel and the steering shaft in the adjacent driving units is changed to opposite to each other to relax the interference caused by external torque turbulence between the driving wheels and the ground where the vehicle is running.

In the configuration as described above, it is possible to eliminate or moderate the external turbulent torque caused from the ground and the steps by the power transmission mechanisms to reduce the adverse effects of the external turbulent torque to the actuators. Thus, the capacities of the actuators an be minimized.

Advantageously, the method further includes: detecting a slip between the driving wheels and the ground based on the output of a sensor disposed on the driving set, the sensor detecting the rotation around the vertical axis of the vehicle and having a gyroscope; and correcting the measured relative angle value between the orientations of the driving wheels and the body of the vehicle based on the detected slip value.

Since the above described method facilitates detecting only the orientation error of the vehicle, the algorithm for detecting the orientation of the vehicle is greatly simplified. Since the above described method facilitates using a rotation measuring system with a low measuring range and a high sensitivity, the measurement and control of the orientation of the vehicle may be conducted with a high precision more than that of the similar conventional system.

Advantageously, the method further includes: detecting the rotation angle around the vertical axis of the vehicle by a sensor disposed on the body of the vehicle and having a gyroscope; and adding the detected rotation angle to the stored data for the orientation of the body of the vehicle to correct stored error data of the orientation of the body of the vehicle.

According to the invention, the interference between the control system and the driving system is avoided, the control system and the driving system are simplified, and the capacities of the actuators and the electric power consumption are reduced. The vehicle according to the invention is a practical holonomic omnidirectional vehicle that can be manufactured at low costs, and exhibit a high reliability with a very precise running capability.

DETAILED DESCRIPTION OF PREFERRED EMBODIMENTS

Now the invention will be described hereinafter with reference to the accompanied drawings which illustrate the preferred embodiments of the invention.

First embodiment

Figure 1:
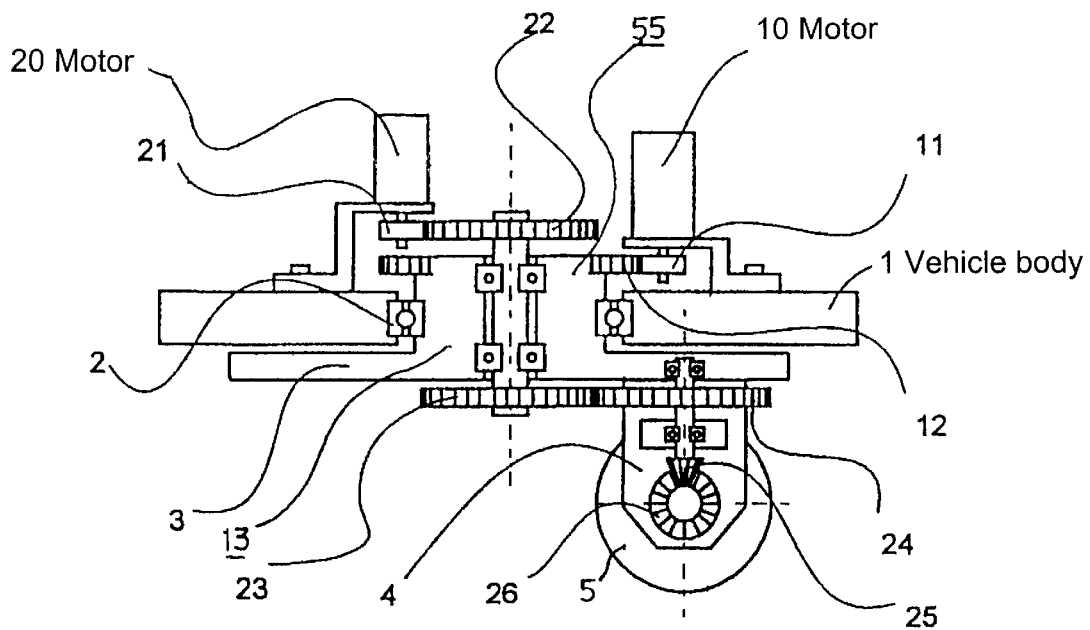
FIG. 1 is a side view of an omnidirectional vehicle according to first and second aspects of the invention.
Figure 2:
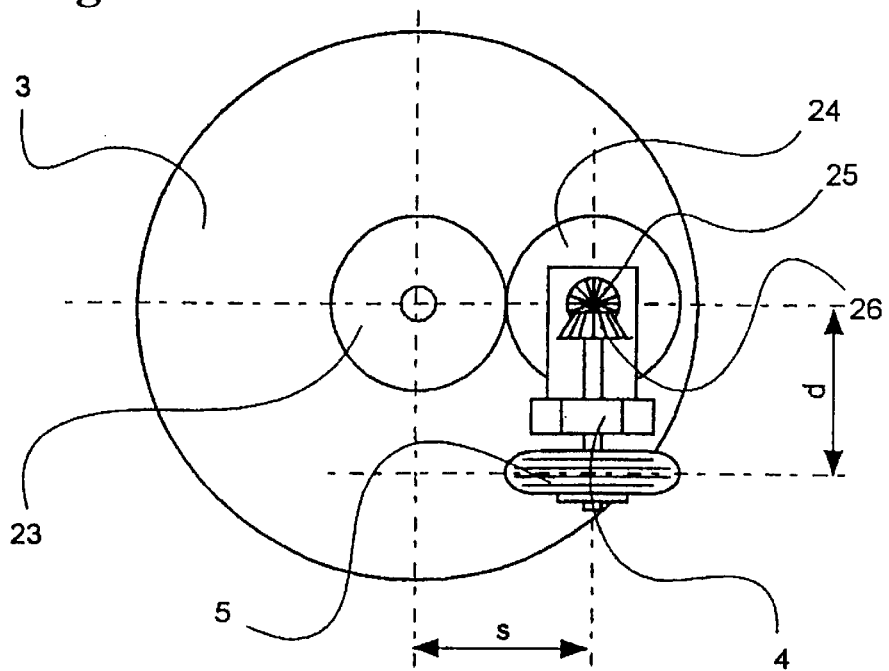
FIG. 2 is a top plan view of the omnidirectional vehicle of FIG. 1.

FIG. 1 is a side view of an omnidirectional vehicle according to a first embodiment of the invention. FIG. 2 is a plan view of the omnidirectional vehicle of FIG. 1.

Referring now to these figures, a bearing 2 rotatably supports a steering shaft 13 around a vertical axis of a body 1 of the vehicle. The steering shaft 13 includes a rotor plate 3. A driving wheel 5 is axially supported by a supporter 4 fixed to the rotor plate 3. The driving wheel 5 is positioned at the location spaced apart for an offset distance s from the center of the rotating axis of the steering shaft 13 in the rolling direction of the driving wheel 5 and spaced apart for an offset distance d perpendicular to the line passing through the center of the rotating axis of the steering shaft 13 and extending in the rolling direction of the driving wheel 5, i.e. in the direction parallel to the rotating shaft of the driving wheel 5. A motor 10 for driving the steering shaft 13 and a motor 20 for driving the shaft of the driving wheel 5 are fixed to the body 1 of the vehicle.

The motor 10 rotates the rotor plate 3 via a spur gear 11 on the shaft of the motor 10 and a spur gear 12 on the steering shaft. The motor 20 rotates the driving wheel 5 via a gear 21 on the shaft of the motor 20, spur gears 22, 23, 24, and bevel gears 25, 26.

When the motor 10 is rotated while the motor 20 is stopped, the rotor plate 3 rotates. Since the spur gear 24 rotatably fixed to the rotor plate 3 rotates around the spur gear 23 like a planetary gear, the spur gear 24 rotates with respect to the rotor plate 3. As a result, the driving wheel 5 rotates.

Figure 3:
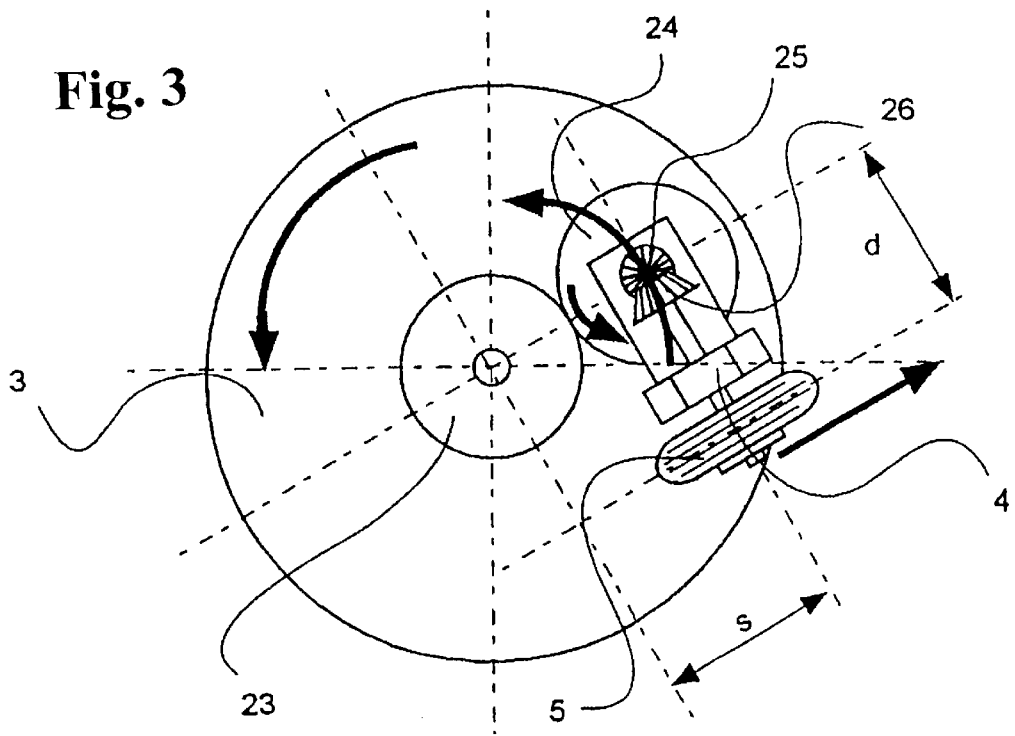
FIG. 3 is a top plan view of the omnidirectional vehicle of FIGS. 1 and 2 for explaining the principle of operation thereof.
Figure 4:
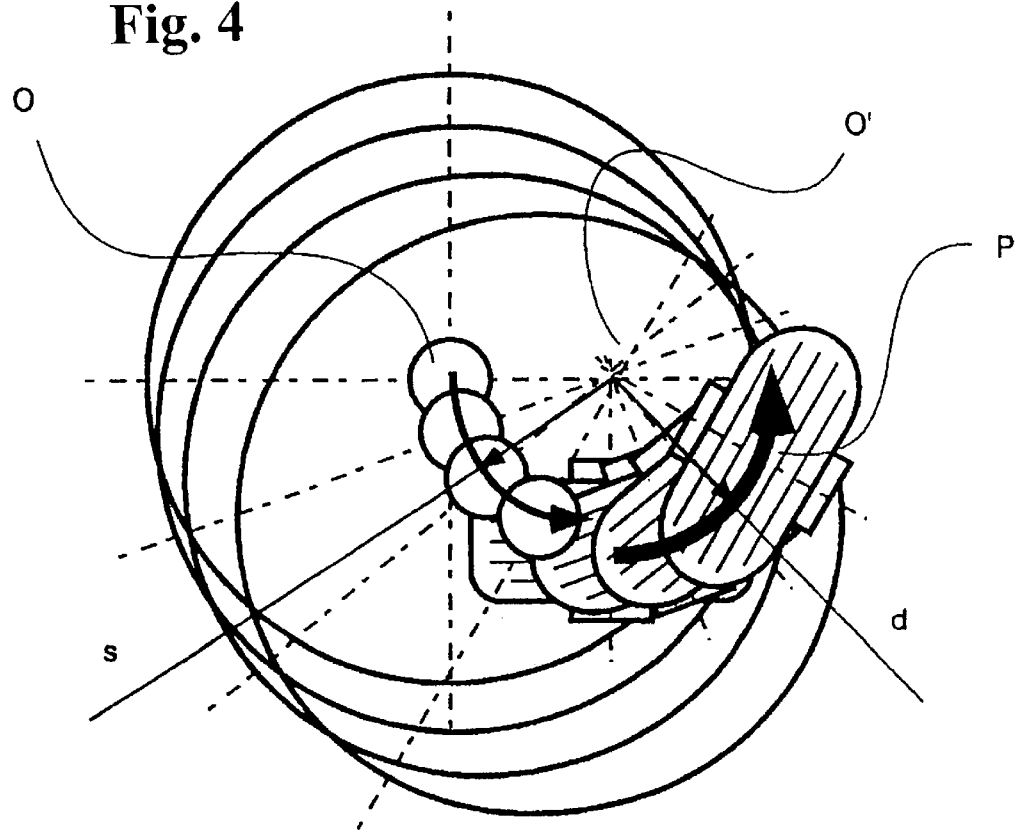
FIG. 4 is another plan view of the omnidirectional vehicle of FIGS. 1 and 2 for explaining the principle of operation thereof.

Although the motor 20 for driving the shaft of the driving wheel is not rotating, the driving wheel 5 rotates and moves to the right hand side of the plane of a sheet when the rotor plate 3 is rotated counterclockwise on the plane of the sheet as shown in FIGS. 3 and 4. By adjusting the offset distance d, the traveling distance of the driving wheel 5 on the ground due to the rotation thereof, caused by the velocity interference with respect to the change of the orientation of the driving wheel 5 caused by the rotation of the motor 10, is optimized at a value such that the velocity interference described above is avoided. More specifically, by adjusting the offset distance d such that the driving wheel rolls on the point spaced apart for the offset distance s from the steering shaft, that is on the circle where the center thereof is located at the point O' and the radius thereof is d, the center O of the steering shaft moves on the circle, the center thereof is located at the point O' and the radius thereof is s.

The movement, where Japanese Patent Unexamined Publication No. 9-164968 has aimed, is obtained and the velocity interference of the motors 10 and 20 is avoided by the wheel mechanism described above, since any velocity vector pointing to the rolling direction of the driving wheel 5 is not generated at the point O as far as the motor 20 for driving the shaft of the driving wheel is not rotated.

Now, the method of determining the rolling direction of the driving wheel 5 and the offset distance d will be explained as described below. The rolling direction of the driving wheel 5 is determined by the gear configuration and the orientation of the driving wheel 5 with respect to the steering shaft. As described above, the driving wheel 5 in the arrangement described with reference to FIGS. 1 and 2 turns and moves to the right hand side of the plane of sheet while changing the orientation thereof counterclockwise as shown in FIG. 4 when the rotor plate 3 is turned counterclockwise on the plane of the sheet. There exists an important relation between the turning direction of the driving wheel 5 and the momentary traveling direction of the driving wheel 5 with respect to the ground.

As shown in FIG. 4, the driving wheel 5 has to move to the right hand side when the driving wheel 5 turns counterclockwise. The turning direction may be inverted, for example, by inserting a spur gear as an idler between the spur gears 23 and 24.

The offset distance d is adjusted by making the turning center of the driving wheel 5 to coincide with the point O'. The reduction gear ratio G from the gear 23 to the wheel 5 is expressed by the following equation (1) when the gears 23 to 26 have the effective radii $r_{23}$ through $r_{26}$. The reduction gear ratio G of more than 1 indicates deceleration.

$$G = (r_{24}/r_{23}) \times (r_{26}/r_{25}) \tag{1}$$

Now, it is considered that only the actuator 10 for driving the steering shaft is driven to rotate the rotor plate 3. When the rotor plate 3 rotates for a rotation angle vs, the spur gear 24 rotates around the spur gear 23 (not rotating) for the angle $v_s$ like a planetary gear. When the spur gear 24 rotates for the angle $v_s$, the spur gear 24 rotates around the point O' for an angle $\theta_{23}$, that is expressed by the following equation (2).

$$\theta_{23} = (r_{23}/r_{24}) \theta_s \tag{2}$$

If the driving wheel 5 rotates for an angle $\theta_w$ when the spur gear 24 rotates around the point O' for the angle $\theta_{23}$, the angle $\theta_w$ is expressed by the following equation (3) and the traveling distance a of the driving wheel 5 is expressed by the following equation (4).

$$\theta_w = (r_{25}/r_{26}) \theta_{23} \tag{3}$$

$$a = r\theta_w \tag{4}$$

Here, r is the radius of the driving wheel 5.

By inserting the equations (1) through (3) into the equation (4), the following equation (5) is obtained.

$$a = (r/G) \theta_s \tag{5}$$

Figure 5:
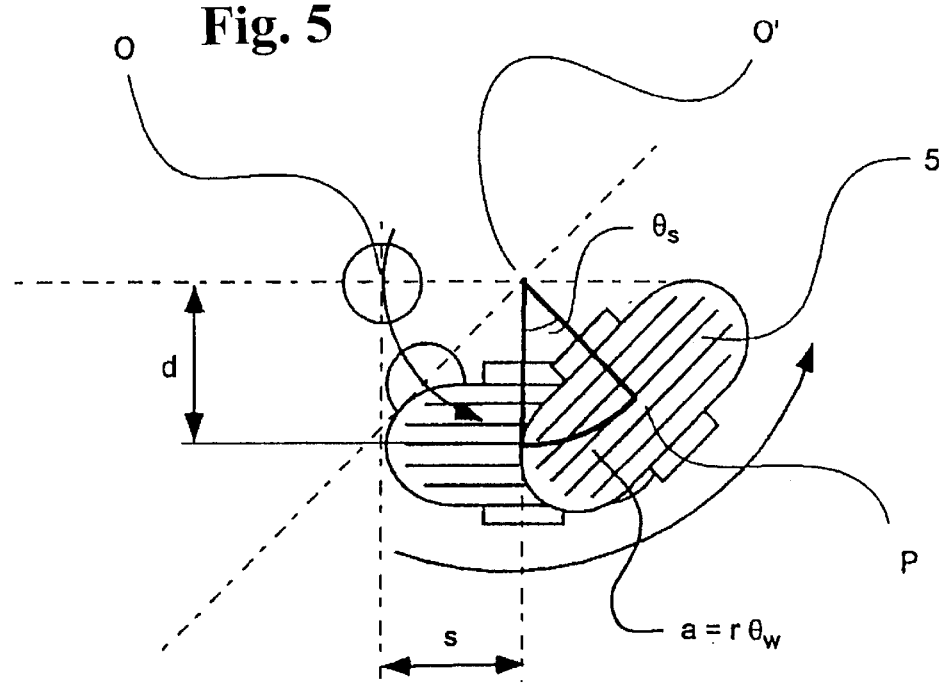
FIG. 5 is a plan view of the driving wheel and the steering shaft for explaining the equations according to the second aspect of the invention.

To make the driving wheel 5 roll on the circle where the center thereof is located at the point O' and the radius thereof is d, it is necessary to meet the relation between $\theta_w$ and $\theta_s$ as shown in FIG. 5. Since the arc with the radius d becomes equal to the traveling distance of the driving wheel 5, the condition is expressed by the following equation (6).

$$d \theta_s = a \tag{6}$$

The offset distance d derived by eliminating $\theta_s$ from the equations (5) and (6) is expressed by the following equation (7).

$$d = r/G \tag{7}$$

When the distance d is adjusted at the value that meets the condition described above, the driving wheel 5 turns on the circle, where the center thereof is located at the point O' and the radius thereof is d, by the rotation of the steering shaft caused only by driving the motor 10, and also, the center of the steering shaft, i.e. the point O, turns on the circle, where the center thereof is located at the point O' and the radius thereof is s. Due to the movements of the driving wheel and the steering shaft described above, the steering shaft is able to generate thereat a velocity perpendicular to the rolling direction of the driving wheel. When the motor 20 is driven, only the driving wheel rotates, and the steering shaft generates a velocity in the rolling direction of the driving wheel.

Since the velocities perpendicular to each other are generated on the steering shaft only by driving the motor 10 and only by driving the motor 20 respectively, the steering shaft is moved to all the directions by controlling the motor 10 and the motor 20 independently irrespective of the orientation of the driving wheel.

Second Embodiment

Figure 6:
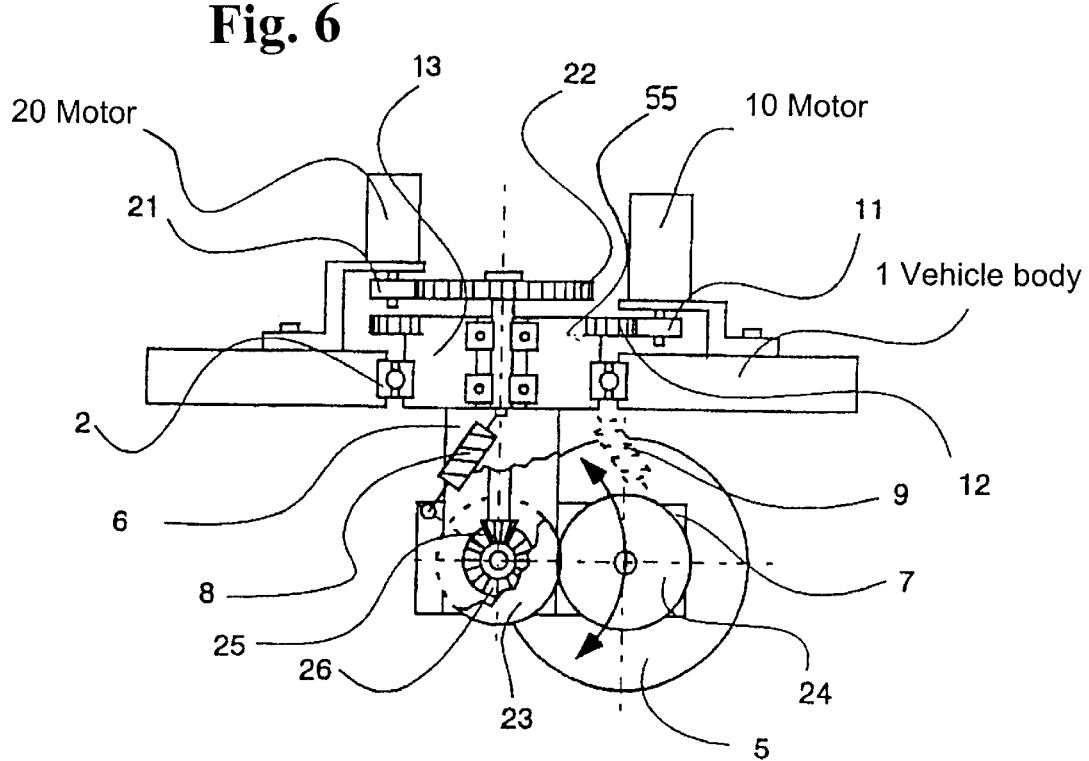
FIG. 6 is a side view of the omnidirectional vehicle according to third and fourth aspects of the invention.
Figure 7:
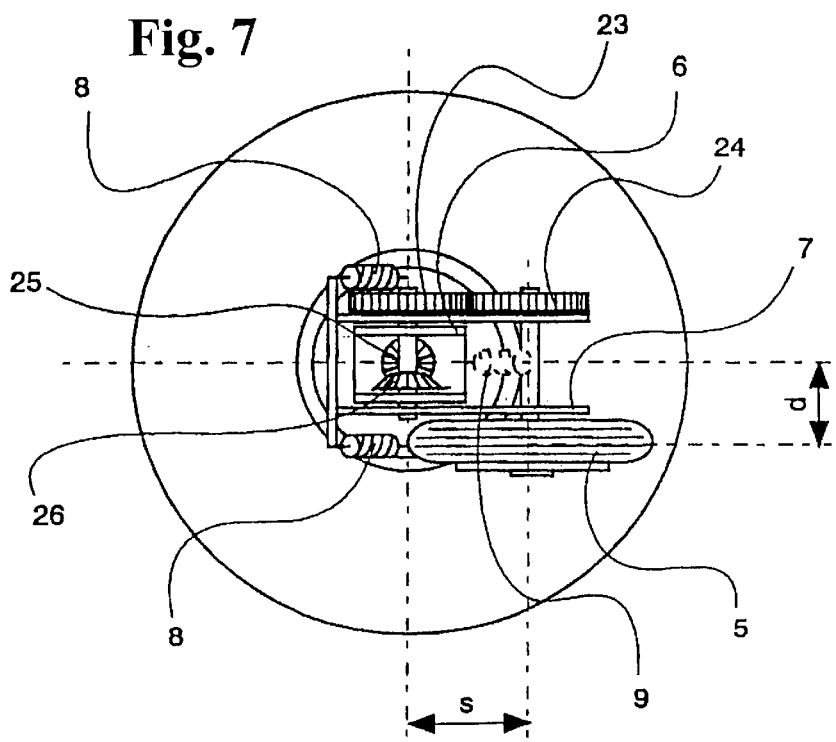
FIG. 7 is a bottom view of the omnidirectional vehicle of FIG. 6.

FIG. 6 is a side view of a holonomic omnidirectional vehicle according to second and third aspect of the invention. FIG. 7 is a bottom view of the holonomic omnidirectional vehicle of FIG. 6.

Referring now to these figure, the arrangements of the spur gears 23 and 24 and the arrangements of the bevel gears 25 and 26 on the power transmission path are opposite to the arrangements in the first embodiments. This configuration provides a dimensional leeway for moving up and down the driving wheel 5, since not only the spur gears may be arranged in a vertical plane but also the shaft driven by the gear 22 may be extended from the center of the steering shaft 13 to the height near the center of the driving wheel 5, and therefore, it becomes unnecessary to dispose a gear and such a mechanism above the driving wheel 5.

According to the second embodiment, a support link 7 supports the spur gear 24 and the driving wheel 5. The support link 7 is separated from the steering shaft connector 6 fixed to the steering shaft 13. The support link 7 is supported rotatably around the spur gear 23 and the bevel gear 26. Moreover, an extension spring 8 is inserted between a side opposite to the side where the driving wheel 5 of the support link 7 is arranged, and the steering shaft 13, so that a force for pushing the driving wheel 5 to the ground is generated.

When a compression spring 9 is employed alternatively, the spring 9 is inserted between a side where the driving wheel 5 of the support link 7 is arranged, and the steering shaft 13, such that a force for pushing the driving wheel 5 to the ground is generated. A damper may be used together with the spring 8 or 9. The vibration absorbing capability and the ground contact capability of the suspension mechanism constructed as described above are changed by adjusting the spring constant and the viscosity coefficient.

Third Embodiment

The wheel mechanism in the omnidirectional vehicle according to the second embodiment includes suspensions, each independently suspending each wheel. The suspension moves up and down the pertinent driving wheel in response to the unevenness of the ground. The spring in the suspension sustains the vertical reactive force exerted to the driving wheel and deforms in proportion to the reactive force. Therefore, the vertical reactive force exerted to the driving wheel is measured by detecting the deformation of the spring in the suspension.

The deformation of the spring is detected by a potentiometer, and such a simple sensor (not shown in FIG. 6) detects a linear deformation. The total weight of the vehicle including the weight of the load that the vehicle is carrying is estimated by examining the data from the sensors for the respective driving wheels. The location of the center of gravity is estimated from the distribution of the force measured by the sensors.

Fourth Embodiment

Figure 8:
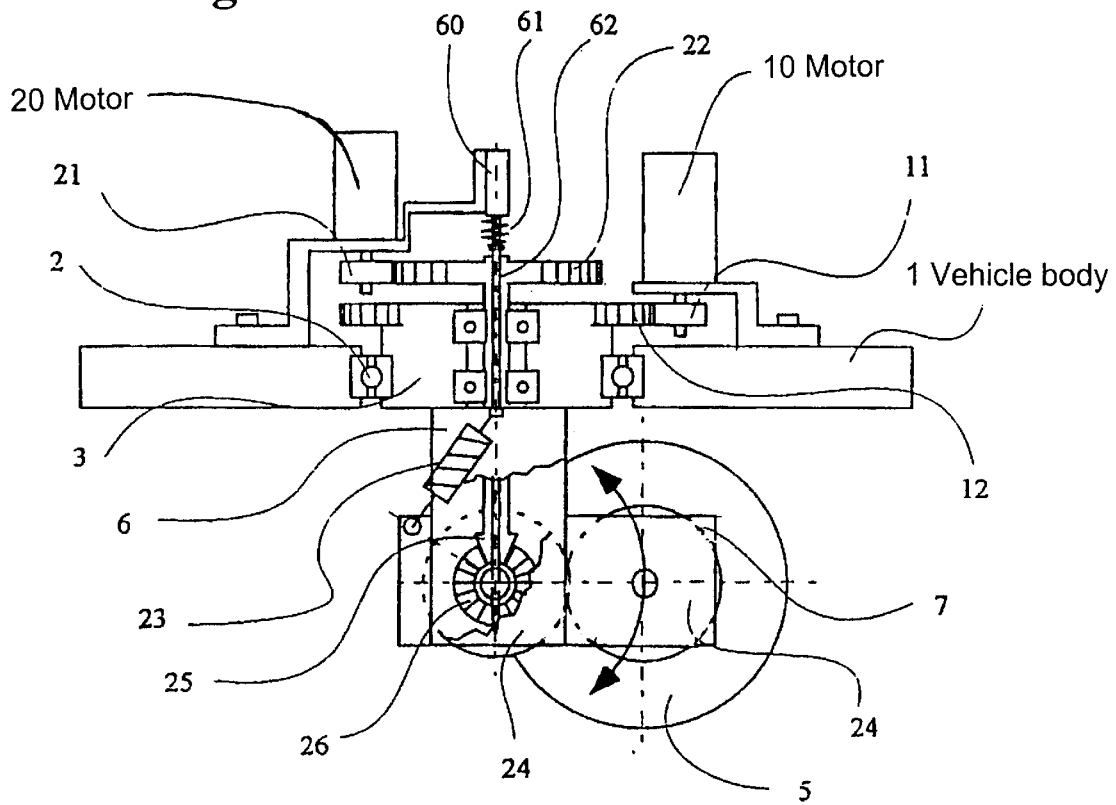
FIG. 8 is a side view of an omnidirectional vehicle according to a fifth aspect of the invention.

The omnidirectional vehicle according to the third embodiment includes sensors mounted on the springs for measuring the vertical reactive forces exerted to the driving wheels 5. The sensor that is mounted on the portion and rotates as the driving wheel 5 rotates causes wiring problem. To obviate the wiring problem, a rotatable rod 62 is inserted into the steering shaft as shown in FIG. 8, and the deformation of the spring is measured by detecting the displacement of the rotatable rod 62.

Figure 9A:
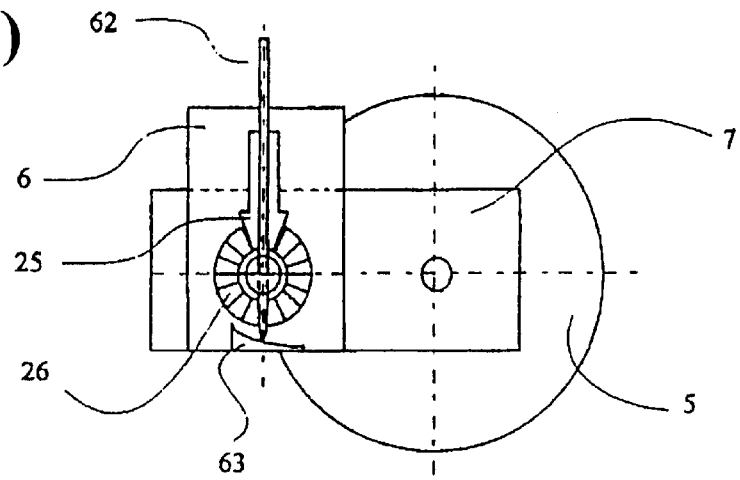
FIGS. 9(a) through 9(c) are side views for explaining the operation in the omnidirectional vehicle of FIG. 8.
Figure 9B:
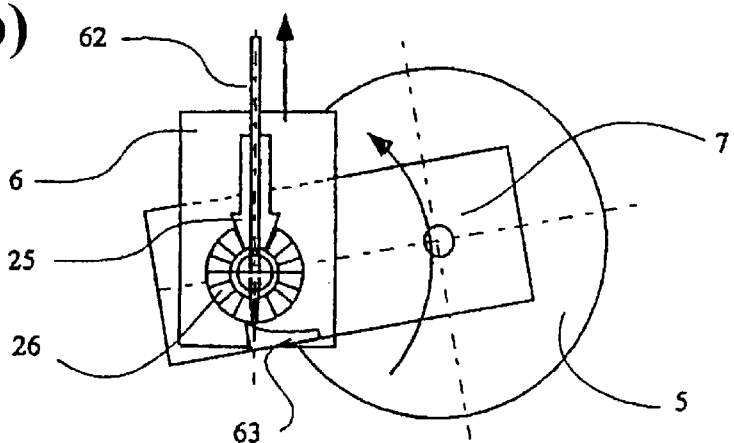
Figure 9C:
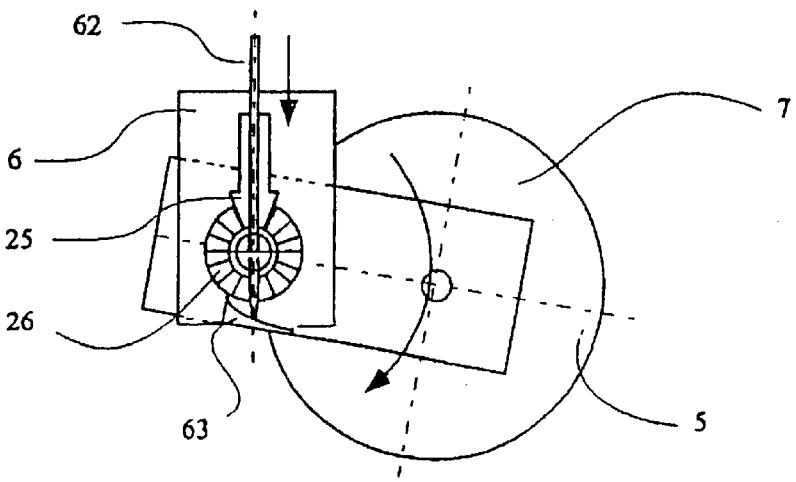

A spring 61 on top of the rotatable rod 62 always presses the rotatable rod 62 downward. The deformation of the spring 61 is detected by a linear displacement measuring instrument 60, such as a liner potentiometer, fixed to the body 1 of the vehicle. The tip of the rotatable rod 62 contacts a slider 63 as shown in FIGS. 9(a) through 9(c) so that the rotatable rod 62 may be moved up and down by the rotation of the suspension mechanism. The rotatable rod 62 rises when the driving wheel 5 moves up toward the body 1 of the vehicle as shown in FIG. 9(b) and lowers when the driving wheel 5 moves down away from the body 1 of the vehicle as shown in FIG. 9(c).

Fifth Embodiment

Figure 10A:
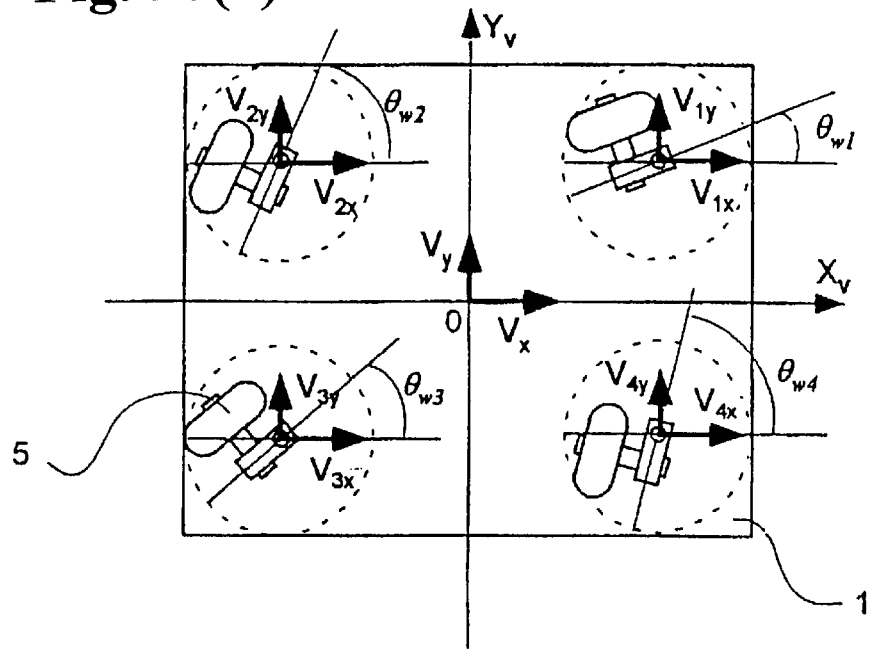
FIGS. 10(a) and 10(b) are velocity vector diagrams for explaining the operation of an omnidirectional vehicle according to a sixth aspect of the invention.
Figure 10B:
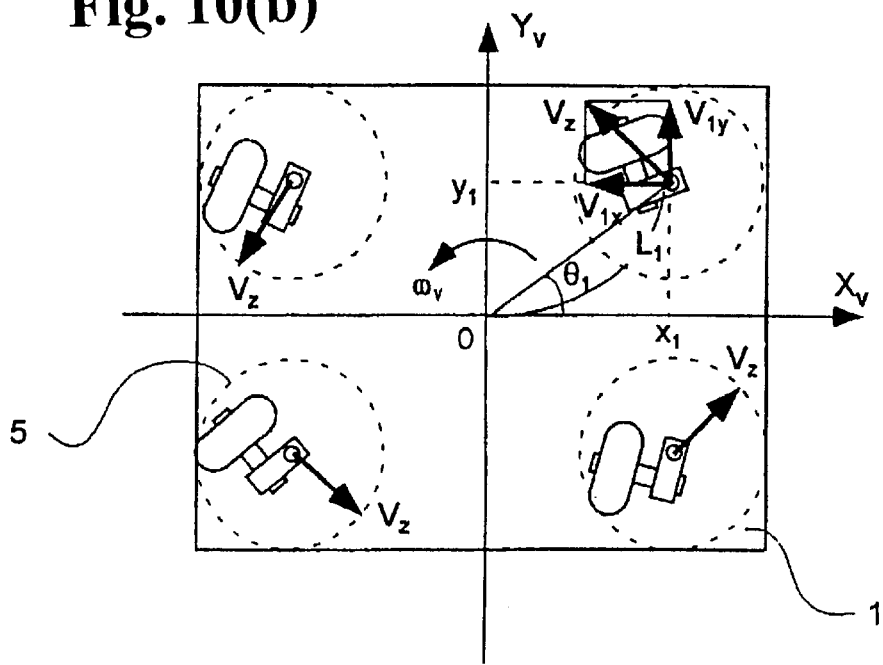

FIGS. 10(a) and 10(b) are velocity vector diagrams for explaining the operation of an omnidirectional vehicle according to a fifth embodiment of the invention. The omnidirectional vehicle according to the fifth embodiment includes two or more driving units described with reference to FIGS. 1 through 3. The omnidirectional vehicle shown in FIGS. 10(a) and 10(b) exemplarily includes four driving units.

The origin of vehicle-based coordinates is set imaginarily at the control reference point of the vehicle. The location of the center of the steering shaft of the i-th driving unit is defined by $x_i$ and $y_i$. When the vehicle executes a translational movement at the velocity component $v_{vx}$ along the x-axis and the velocity component $v_{vy}$ along the y-axis without including any turning movement, it is required for the velocity components of each driving unit along the x- and y-axes to be the same with the velocity components of the vehicle as described in the following equations (8) independently of the location $(x_i, y_i)$ thereof.

$$v_{ix} = v_{vx} \quad (i=1, 2\ldots)$$

$$v_{iy} = v_{vy} \quad (i=1, 2\ldots) \tag{8}$$

When the vehicle executes a stationary turning movement (turning movement without accompanying any translational movement) at an angular velocity iv around the reference point O as shown in FIG. 10(b), the velocity components $v_{ix}$ and $v_{iy}$ required for each driving unit is expressed by the following equations (9).

$$V_{ix} = -L_i \omega_v \sin \theta_i \quad (i=1, 2\ldots)$$

$$v_{iy} = L_i \omega_v \cos \theta_i \quad (i=1, 2\ldots) \tag{9}$$

As shown in FIG. 10(b), $L_i$ is the distance between the reference point of the vehicle and the center of the steering shaft of the i-th driving unit, and $\theta_i$ is the angle of the line drawn from the origin of the vehicle-based coordinates and the center of the steering shaft of the i-th driving unit. Due to the geometrical condition, the following equations (10) are derived from the description in FIG. 10(b).

$$L_i \cos \theta_i = x_i \quad (i=1, 2\ldots)$$

$$L_i \sin \theta_i = y_i \quad (i=1, 2\ldots) \tag{10}$$

By substituting the equations (10) into the equations (9) to eliminate $L_i$ and $\theta_i$, the following equations (11) are obtained.

$$v_{ix} = -\omega_v y_i \quad (i=1, 2\ldots)$$

$$v_{iy} = -\omega_v x_i \quad (i=1, 2\ldots) \tag{11}$$

When the vehicle executes the translational movement and the turning movement described above, it is required for the velocity components of each driving unit to be the sum of the equations (8) and the equations (9). By adding the right hand sides of the equations (8) and (9), the velocity components $v_{ix}$, and $v_{iy}$ along the x-and y-axes required for the vehicle to conduct an arbitrary translational movement accompanying an arbitrary rotational movement are expressed by the following equations (12).

$$v_{ix}=v_{vy}+\omega_v Y_i \ (i=1, 2. \ldots)$$

$$v_{ix}=v_{vy}+\omega_v Y_i \ (i=1, 2. \ldots) \tag{12}$$

The velocity $v_{wix}$ in the traveling direction of the driving wheel 5 of each driving unit and the velocity $v_{wiy}$ perpendicular to the traveling direction of the driving wheel 5 of each driving unit are expressed by the following equations (13) driven by applying rotational transformations on the velocities expressed by the equations (12) described on the vehicle-based coordinates.

$$\begin{aligned} v_{wix} &= v_{ix}\cos\theta_{wi} + v_{iy}\sin\theta_{wi} \\ &= v_{vx}\cos\theta_{wi} + V_{vy}\sin\theta_{wi} + \omega_v(x_i\sin\theta_{wi} - y_i\cos\theta_{wi}) \\ v_{wiy} &= -v_{ix}\sin\theta_{wi} + v_{iy}\cos\theta_{wi} \\ &= -v_{vx}\sin\theta_{wi} + v_{vy}\cos\theta_{wi} + \omega_v(x_i\cos\theta_{wi} + y_i\sin\theta_{wi}) \end{aligned} \tag{13}$$

Here, i=1, 2, . , and $\theta_{wi}$ is the orientation of each driving wheel on the vehicle-based coordinates as shown in FIG. 10(*a*).

The reference angular velocity values fed to the motors for driving the steering shafts and for driving the shafts of the driving wheels are given by the following equations (14).

$$\omega_{mwi}=(Gw/r)\{v_{vx}\cos\theta_{wi}+v_{vy}\sin\theta_{wi}+\omega_v(x_i\sin\theta_{wi}-Y_i\cos\theta_{wi})\}$$

$$\omega_{msi}=(Gs/s)\{-v_{vx}\sin\theta_{wi}+v_{vy}\cos\theta_{wi}+\omega_v(x_i\cos\theta_{wi}+y_i\sin\theta_{wi})\} \tag{14}$$

Here, $\omega_{mwi}$ is the angular rotating velocity of the actuator for driving the shaft of the driving wheel of the i-th driving unit;

$\omega_{msi}$ is the angular rotating velocity of the actuator for driving the steering shaft of the i-th driving unit;

$v_{vx}$ is the velocity of the vehicle along the x-axis;

$v_{vy}$ is the velocity of the vehicle along the y-axis;

$\omega_v$ is the angular rotating velocity of the vehicle around the reference point;

r is the radius of the driving wheel;

s is the horizontal distance between the steering shaft and the shaft of the driving wheel in the traveling direction of the driving wheel;

$x_i$ is the x-axis coordinate on the vehicle-based coordinates for the location of the steering shaft in the i-th driving unit;

$y_i$ is the y-axis coordinate on the vehicle-based coordinates for the location of the steering shaft in the i-th driving unit;

$\theta_{wi}$ is the orientation of the driving wheel in the i-th driving unit on the vehicle-based coordinates;

Gs is the reduction gear ratio of the power transmitting means of the actuator for driving the steering shaft; and Gw is the reduction gear ratio of the power transmitting means of the actuator for driving the shaft of the driving wheel.

As described above, each driving unit is able to independently determine the movement of the driving wheel thereof based on the coordinates of the center of the steering shaft and using the data of the orientation thereof without considering the states of the other driving units nor using the data of the other driving wheels.

Since the above described performance is achieved by the controller of each driving unit that receives data exclusively from the controller that controls the movements of the entire vehicle, the expansion of the vehicle system is facilitated and the reliability thereof is improved. For performing the operation as described above, it is necessary to provide the vehicle with two or more driving units. When the vehicle is provided with two or more driving units, there is no limitation in the arrangements and the number of the driving units, and flexible designing of the vehicle is facilitated.

Sixth Embodiment

Figure 11:
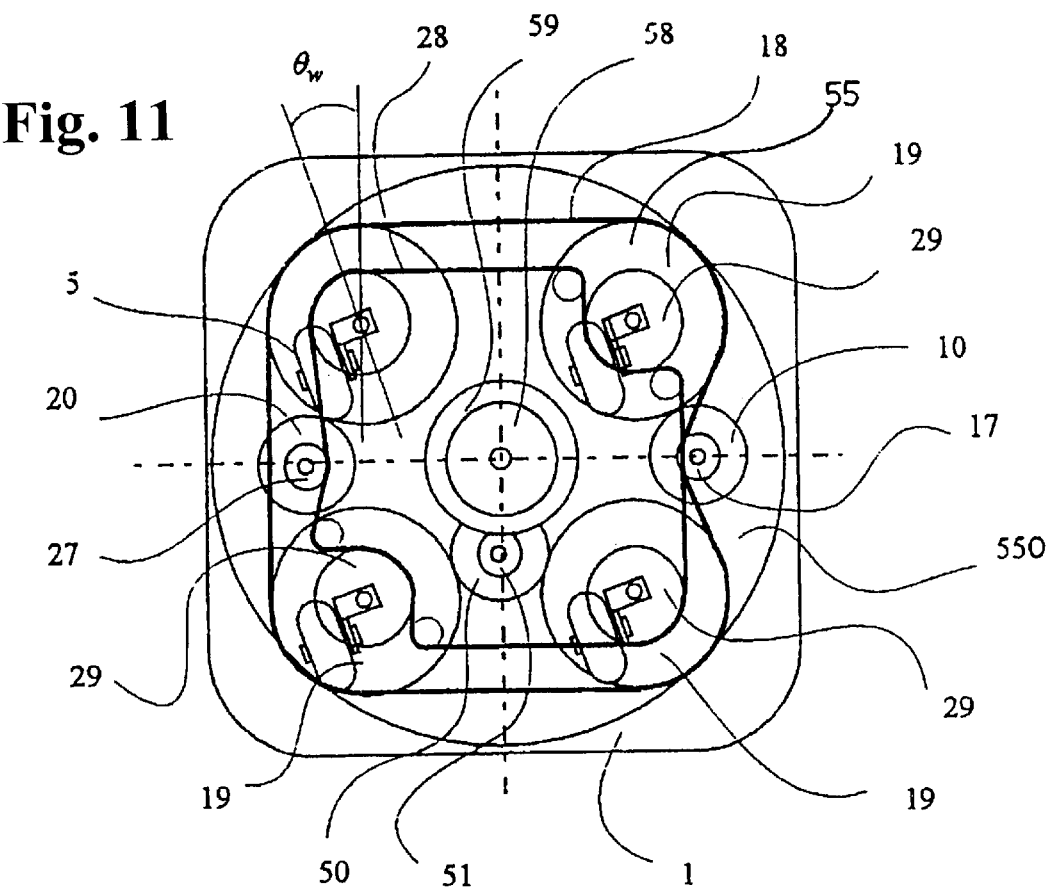
FIG. 11 is a plan view of an omnidirectional vehicle according to seventh, eighth and ninth aspects of the invention.
Figure 12:
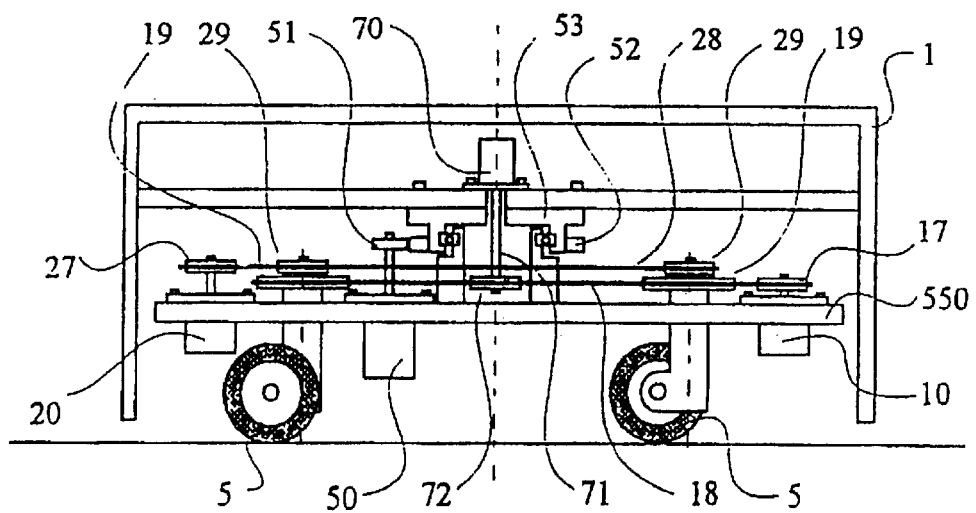
FIG. 12 is a side view of an omnidirectional vehicle according to the embodiment of FIG. 11.

FIG. 11 is a plan view of an omnidirectional vehicle according to a sixth embodiment of the invention. FIG. 12 is a side view of the omnidirectional vehicle of FIG. 11. Referring now to these figures, the omnidirectional vehicle according to the sixth embodiment includes a driving set 550. The driving set 550 includes a plurality of (four in FIG. 11) driving units 55, motors 10 and 20 being eliminated, as a wheel mechanism. The driving set 550 also includes pulleys 19 for driving the respective steering shafts of the wheel mechanism. The pulleys 19 are dynamically coupled with each other via a belt 18 so that all the driving wheels may orient in the same direction. Pulleys 29 for driving the respective driving wheels 5 are dynamically coupled with each other via a belt 28 in the same manner as in the pulleys 19.

The belt 18 that couples the pulleys 19 is driven by a motor 10 for driving the steering shafts. As a result, all the driving wheels 5 are steered simultaneously to always orient in the same direction. The belt 28 that couples the pulleys 29 is driven by a motor 20 for driving the shafts of the driving wheels. As a result, all the driving wheels 5 rotate and move on the ground at the same angular velocity. The driving set 550 including the wheel driving mechanisms described above is able to execute omnidirectional translational movement by controlling the above described two motors synchronously. The method of the synchronous control will be described below.

Since all the driving wheels 5 oriented parallel to each other rotate at the same velocity when the motor 20 for driving the shafts of the driving wheels is driven, the same velocity is generated at the center of the steering shaft of each driving unit in the rolling direction of the driving wheel 5. When the motor 10 for driving the steering shafts is driven, all the driving wheels 5 change the orientations thereof simultaneously. As a result, a velocity perpendicular to the orientation of the driving wheel 5 is generated at the center of each steering shaft. The velocity vectors generated by the motor 20 for driving the shafts of the driving wheels and the velocity vectors generated by the motor 10 for driving the steering shafts are always perpendicular to each other and determined independently by controlling the speeds of the respective motors.

The driving set 550 executes a translational movement at the velocity obtained by synthesizing the velocity vectors at the centers of the steering shafts. Therefore, a synthesized velocity vector is generated in response to a control signal, and the vehicle is moved on the ground to any desired direction by dissolving the velocity vector directed to the desired direction (that is, a reference velocity vector contained in the control signal fed to the vehicle) into a vector pointing to the direction of the driving wheels 5 and a vector pointing perpendicular to the direction of the driving wheels 5 based on the momentary orientation of the driving wheels 5 with respect to the ground and by feeding the dissolved vectors to the respective motors 10 and 20 as the reference velocity vectors thereof continuously or intermittently at a very short interval. The translational velocity vector contained in the control signal fed to the body 1 of the vehicle is dissolved into the reference velocity vector component for the motor 10 and the reference velocity vector component for the motor 20 as described by the following equations (15).

$$\omega_{mw}=(Gw/r)(v_{vx}\cos\theta_w+v_{vy}\sin\theta_w)$$

$$\omega_{ms}=(Gs/s)(-v_{vx}\sin\theta_w+v_{vy}\cos\theta_w) \quad (15)$$

Here, $v_{vx}$ is the velocity of the vehicle along the x-axis;

$V_{vy}$ is the velocity of the vehicle along the y-axis;

$\omega_{mw}$ is the angular rotating velocity of the actuator for driving the shafts of the driving wheels;

$\omega_{ms}$ is the angular rotating velocity of the actuator for driving the steering shafts;

r is the radius of the driving wheel;

s is the horizontal distance between the steering shaft and the driving wheel in the traveling direction of the driving wheel;

$\theta_w$ is the orientation of the driving wheels on the vehicle-based coordinates;

Gs is the reduction gear ratio of the power transmitting means of the actuator for driving the steering shafts; and Gw is the reduction gear ratio of the power transmitting means of the actuator for driving the shafts of the driving wheels.

According to the algorithm described above, the driving set 550 executes a translational movement with the body 1 of the vehicle in any direction within 360 degrees of angle on the ground. Note that the orientation of the driving set 550 is fixed and never changes from the initial state as far as a slip does not occur between any of the driving wheels 5 and the ground. To avoid this problem, a turning stage 53 is mounted on the driving set 550. By rotating the turning stage 53, the body 1 of the vehicle is rotated. The turning stage 53 is rotated by a third motor 50. The motor 50 controls the turning velocity and the orientation of the body 1 of the vehicle fixed to the turning stage 53.

Since the driving set 550 is not turned around the vertical axis by any translational movement thereof, it is not necessary for the velocity control of the motor 50 to consider the translational movement of the vehicle. It is necessary for the motor 50 to rotate only when the turning movement of the body 1 of the vehicle is required. Therefore, the translational movement and the rotational movement of the entire body 1 of the vehicle are controlled independently without causing any interference therebetween. Based on the explanations described above, the control equations for controlling the entire vehicle are expressed by the following equations (16) by combining the equation of the rotational movement with the equations of the translational movement.

$$\omega_w=(Gw/r)(v_{vx}\cos\theta_w+v_{vy}\sin\theta_w)$$

$$\omega_s=(Gs/s)(-v_{vx}\sin\theta_w+v_{vy}\cos\theta_w)$$

$$\omega_r=Gr\omega_v \quad (16)$$

Here, $\omega_v$ is the angular rotating velocity of the vehicle around the reference point;

$\omega_r$ is the angular rotating velocity of the actuator for driving the turning shaft of the vehicle; and Gr is the reduction gear ratio of the power transmitting means of the actuator for driving the turning shaft of the vehicle.

Seventh Embodiment

An omnidirectional vehicle according to a seventh embodiment of the invention will be described below with reference to FIG. 12.

On the driving set 550, there are mounted a plurality of driving units, each including a driving wheel 5; motors 10, 20 and 30; belts 18 and 28 as power transmitting means for dynamically coupling the above described constituent elements; and a turning stage 53. The body 1 of the vehicle turns around the vertical axis passing the center thereof by the motor 50 via a gear 58 rotated by the motor 50 and the turning stage 53 rotated by means of the motor 50. An encoder 70 for detecting an absolute angle is fixed to the body 1 of the vehicle such that the rotation center thereof coincides with the rotation center of the body 1 of the vehicle. The measuring shaft 71 of the encoder 70 is rotated by the belt 18 rotated by the motor 10 via pulleys 19. Due to the arrangement described above, the encoder 70 detects the orientation of the driving wheels with respect to the body 1 of the vehicle without being affected by the state of the driving set 550.

Eighth Embodiment

Figure 13:
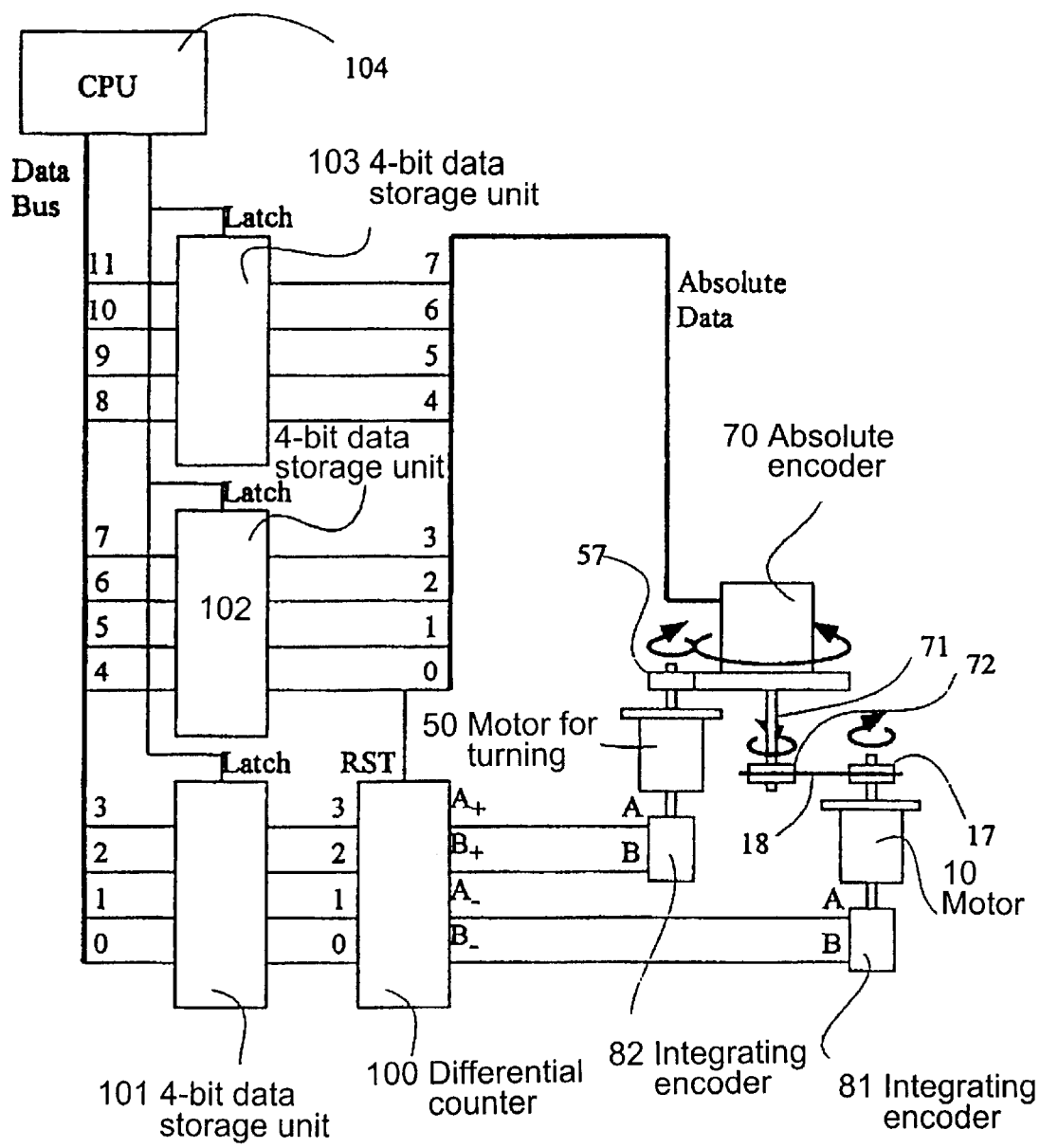
FIG. 13 is a block diagram of a control system according to a tenth aspect of the invention for controlling the omnidirectional vehicle.

FIG. 13 is a block diagram of a control system according to an eighth embodiment of the invention for controlling the omnidirectional vehicle according to the seventh embodiment. To control the omnidirectional vehicle according to the seventh embodiment, an encoder for detecting an absolute angle or a potentiometer is used usually. Recently, encoders of digital output type have been used more often than the potentiometer due to the ease of bidirectional data exchange between the encoder and a computer and due to the ease of constructing a system immune to noises. It is required for the control system for controlling the vehicle according to the invention to detect angles with a high precision, since the velocity components of the vehicle are calculated based on the detected angle data.

The encoder that detects absolute angles using a slit with high mechanical resolution is very expensive. The encoder that performs high resolution by using a battery or backup of very low electric power is not preferable from the view pint of maintenance. To obviate these problems, absolute angles are detected with high resolution by the combination of an encoder that detects absolute angles with relatively low resolution (hereinafter referred to as an "absolute encoder") and an integrating encoder mounted on the motor shaft. The combination of the encoders has been used to measure absolute angles with high resolution. In the combination, high resolution for absolute angle detection is obtained by using the cumulative angle value counted by the integrating counter of the integrating encoder as a measured angle value smaller than the minimum angle that the absolute encoder is able to detect.

For example, when an 8-bit absolute encoder and a 4-bit integrating encoder are combined, the resolution of 12 bits is obtained by using the 8 bits for the upper place bits and the 4-bits for the lower place bits. However, this technique is applicable only to measuring the angle of the shaft driven by one actuator.

Although it is necessary for the omnidirectional vehicle according to the invention to measure the relative angle of the body 1 of the vehicle and the driving wheel 5, the relative angle changes by rotating either one or both of the motor 10 for driving the steering shaft and the motor 50 for turning the body of the vehicle. In the system shown in FIG. 13, the body of the absolute encoder 70 is rotated by the motor 50 and the measuring shaft 71 of the encoder 70 is rotated by the motor 10. In short, one shaft is driven by two motors.

Therefore, the conventional technique described above is not applicable to the omnidirectional vehicle according to the invention. To obviate this problem, the signals from integrating encodes 80 and 81 mounted on the motors 10 and 50 respectively are connected to positive and negative inputs of a counter 100 for detecting the difference between the signals (hereinafter referred to as a "differential counter"). The lowest bit in the signal from the absolute encoder 70 is connected to the differential encoder 100 such that the lowest bit resets the differential counter 100. Temporary data storage units 101 through 103, each assigned to storing 4 bits, stores the momentary state of each bit in response to the latch signal from a CPU 104. By storing the momentary state of each bit as described above, the values measured by the absolute encoder 70 and differential counter 100 are taken in synchronously.

Figure 14A:
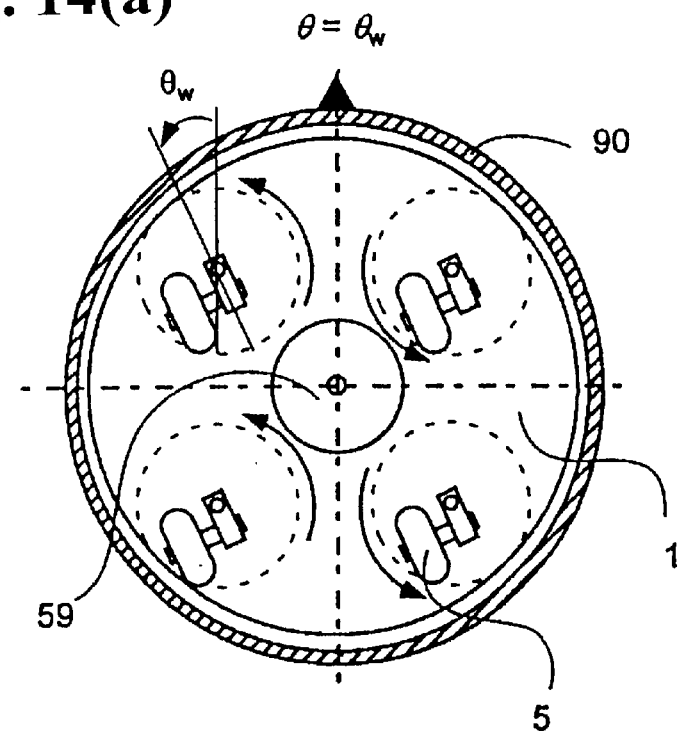
FIG. 14(a) is a plan view of the omnidirectional vehicle for explaining the operation of the system of FIG. 13.
Figure 14B:
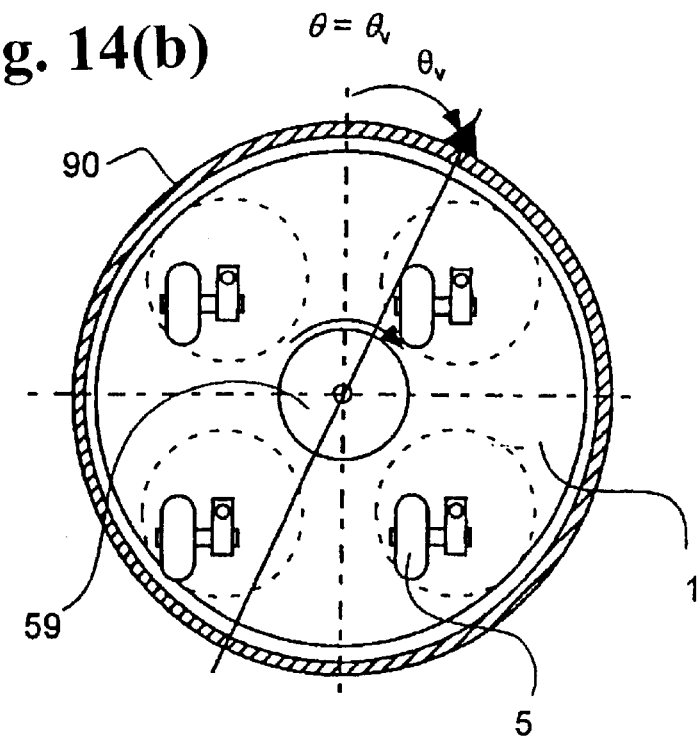
FIG. 14(b) is another plan view of the omnidirectional vehicle for explaining the operation of the system of FIG. 13.
Figure 15:
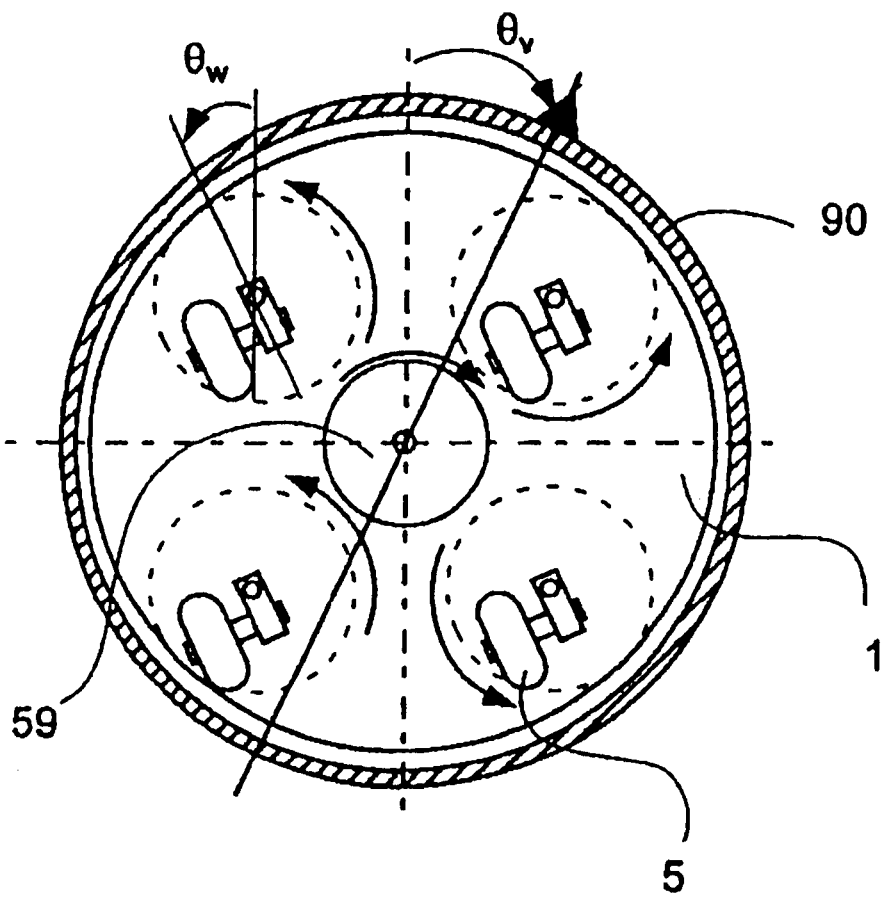
FIG. 15 is still another plan view of the omnidirectional vehicle for explaining the operation of the system of FIG. 13.

The operation of the system shown in FIG. 13 will be described below. When the motor 10 for driving the steering shaft turns the driving wheels 5 counterclockwise as shown in FIG. 14(*a*), or when the motor 50 for turning rotates an outer part 90 of the vehicle in the negative direction, or when the above described both operations are conducted, the relative angle between the outer part 90 of the vehicle and the driving wheels 5 increases. Therefore, the encoder 81 on the motor 10 is connected to the positive input of the differential counter 100, and the encoder 82 on the motor 50 is connected to the negative input of the differential counter 100.

Due to this, the output of the differential counter 100 is equal to the positive input thereof when the driving wheels are slightly steered counterclockwise, indicating the relative angle between the body 1 of the vehicle and the driving wheels 5. When the body 1 of the vehicle is slightly rotated clockwise, the output of the differential counter 100 indicates an angle having an opposite sign to that of the driven angle of the body 1 of the vehicle. In this case too, the output of the differential counter 100 is equal to the relative angle between the body 1 of the vehicle and the driving wheels 5. When the driving wheels are slightly rotated counterclockwise and the body 1 of the vehicle is rotated for the same angle, the differential counter 100 outputs a zero output as a result of the adding and subtracting calculation therein. The output indicative of zero degrees of angle coincides with the relative angle between the body 1 of the vehicle and the driving wheels 5, that is zero degrees of angle.

Since the differential counter 100 is reset when the relative angle changes largely enough to change the lowest place bit of the absolute encoder 70, the differential counter 100 stores the data of the angle change from the instance when the lowest place bit changes. That is, the differential counter 100 is able to always measure the angle smaller than the resolution of the lowest place bit of the absolute encoder 70 using the pulses from the integrating encoders 81 and 82. In FIG. 13, the CPU 104 receives the upper place 8 bits from the absolute encoder 70 and the lower place 4 bits from the differential counter 100 simultaneously from the data storage units 101 through 103 and detects a momentary angle at high resolution by connecting the upper place 8 bits and the lower place 4 bits.

Ninth Embodiment

Now, the omnidirectional vehicle according to a ninth embodiment of the invention will be described with reference to FIG. 16. The omnidirectional vehicle according to the sixth embodiment or the seventh embodiment of the invention, that avoids interference between the velocities of the motors 10 and 20, facilitates to drive the driving units collectively by the motor 10 and the motor 20 even when some driving wheels are offset to the right hand side or the left hand side, or mixed together.

Therefore, it is possible to select a suitable orientation for each driving unit considering the location of the driving wheel on the vehicle and such factors. Now, a method of arranging the driving units of different orientations to avoid or moderate the torque interference between the motor 10 for driving the steering shafts and the motor 20 for driving the shafts of the driving wheels will be explained.

Figure 16:
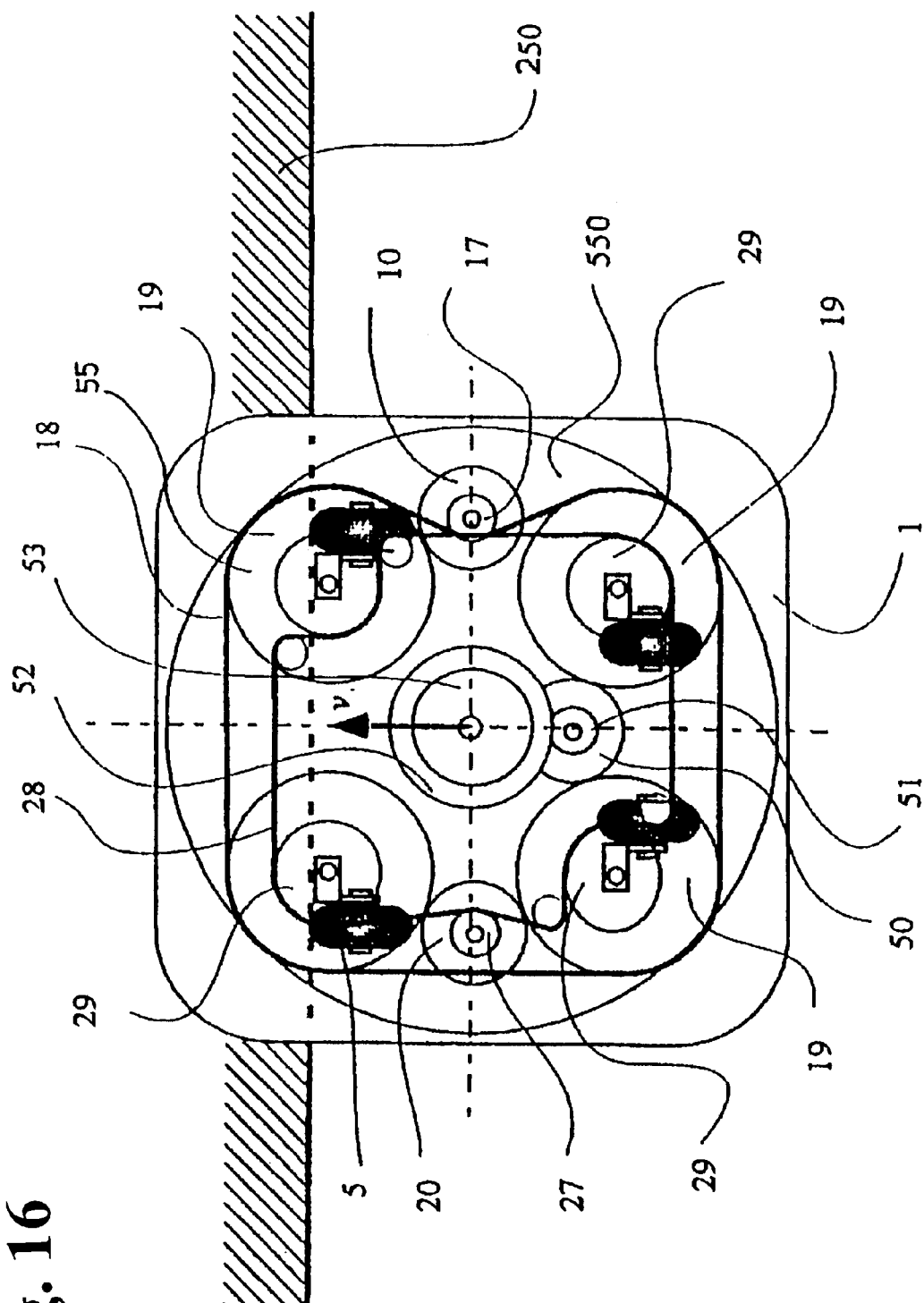
FIG. 16 is a plan view of an omnidirectional vehicle according to an eleventh aspect of the invention.

FIG. 16 is a plan view of an omnidirectional vehicle according to the ninth embodiment of the invention for explaining the operation thereof. In FIG. 16, it is assumed that some driving wheels of the vehicle moves upward on the plane of the sheet and touches the edge of a step 250 while the vehicle is climbing up the step 250. At the time when some driving wheels touch the edge of the step 250, large torque is caused around the steering shaft due to the moment of inertia exerted from the vehicle. At this time, torque that rotates the steering shaft counterclockwise around the steering shaft is exerted to the driving unit on the left front, and the torque that rotates the steering shaft clockwise around the steering shaft is exerted to the driving unit on the right front.

However, since the pulleys 19 for driving the respective steering shafts are coupled by the belt 18, the torque exerted to the driving unit on the left front and the torque exerted to the driving unit on the right front pulls the belt 18 in the directions opposite to each other. Since the torque exerted to the driving unit on the left front and the torque exerted to the driving unit on the right front are canceled with respect to each other as an internal force exerted to the driving set 550, the torque exerted to the driving unit on the left front and the torque exerted to the driving unit on the right front are not transmitted to the motor 10 for driving the steering shafts. Therefore, when the two driving wheels 5 collide against a step, the influences of the external torque turbulence caused by colliding against the step are almost removed.

When the vehicle executes an omnidirectional movement, it is preferable for the driving wheel on the right front in the traveling direction and the driving wheel on the left front in the traveling direction to be different in orientation. To perform this condition, the driving wheels and the steering shafts are arranged such that the positional relations between the driving wheels and the steering shafts in the adjacent driving units are disposed opposite to each other as shown in FIG. 16. In other words, the driving wheels of the driving units on a diagonal line are in the same orientation. The orientation of the driving wheels on a diagonal line and the orientation of the driving wheels on the other diagonal line are different from each other.

Tenth Embodiment

Figure 17:
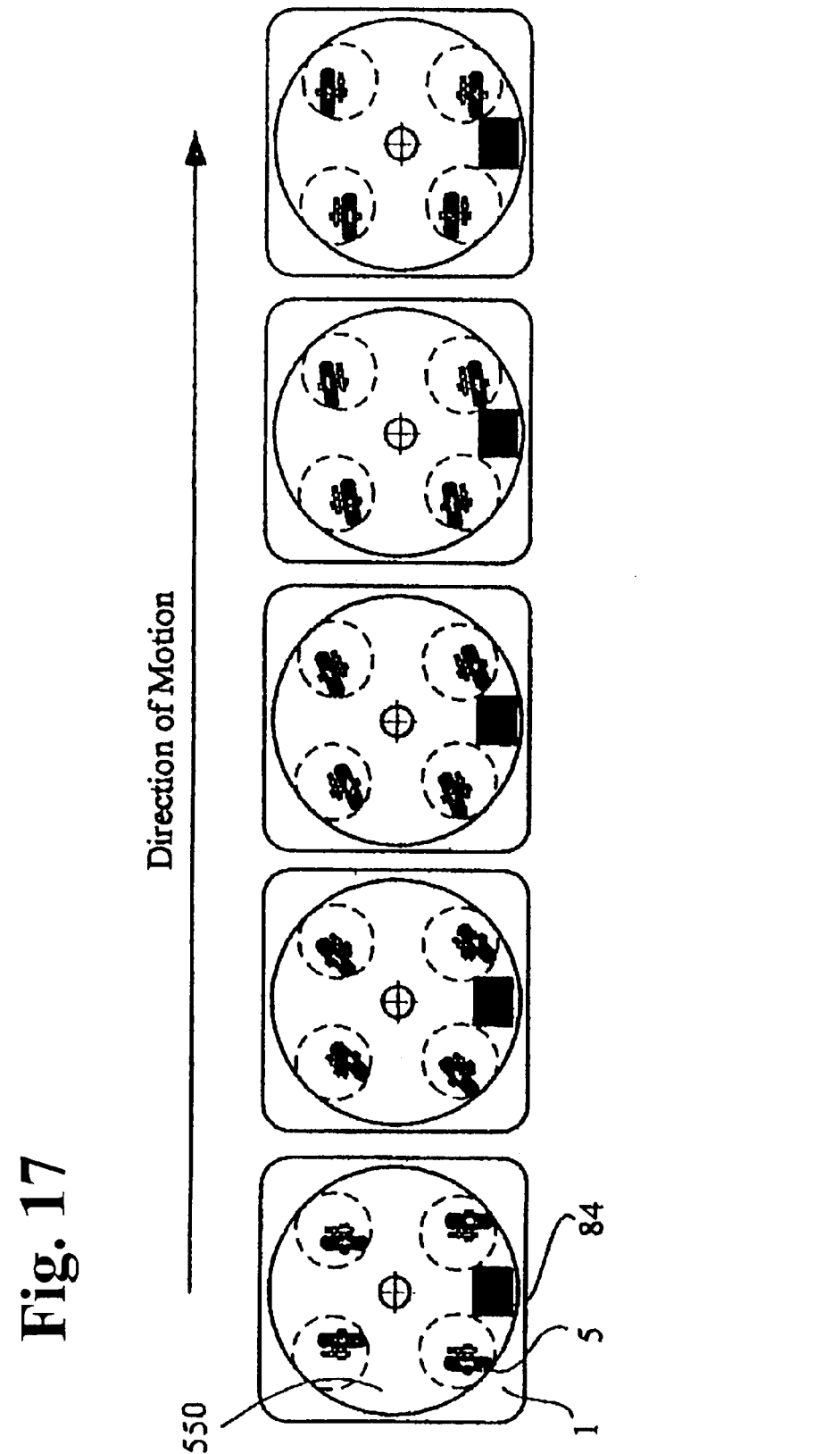
FIG. 17 shows plan views for explaining the operation of an omnidirectional vehicle according to a twelfth aspect of the invention.

Now, the omnidirectional vehicle according to a tenth embodiment of the invention will be described with reference to FIG. 17. One of the specific features of the omnidirectional vehicle or the method of controlling thereof according to any of the sixth through ninth embodiments is that the driving set 550 does not rotate when the vehicle operates ideally, that is when any slip does not occur between the driving wheels and the perfectly flat plane. FIG. 17 shows a vehicle moving perpendicular to the original pointing direction of the driving wheels. FIG. 17 indicates obviously that a slip occurs between the driving wheels 5 and the ground when the body 1 of the vehicle rotates around the vertical axis, that is, the vehicle is not in the ideal running state.

The slip caused between the driving wheels 5 and the flat ground is detectable by a rotation sensor 84, such as a gyroscope, that measures the rotation around the vertical axis, mounted on the driving set 550. Since the driving set 550 rotates not so fast in the situation as described above, a sensor, the measurable range thereof being narrower than the conventional rotation sensor and the resolution and the sensitivity thereof being high, is used for the rotation sensor 84. The rotation sensor 84 as described above improves the angle detection precision and the running precision of the vehicle.

Eleventh Embodiment

Now, the omnidirectional vehicle according to an eleventh embodiment of the invention will be described with reference to FIG. 18. Since the positional error of the vehicle increases with increasing the traveling distance, the orientation error of the vehicle is affected greatly by the running precision thereof. Therefore, it is important to control the orientation of the vehicle very precisely.

In the omnidirectional vehicle or in the controlling method thereof according to any of the sixth through tenth embodiments, the rotation sensor 84 mounted on the driving set 550 detects only the turning of the driving set 550 irrespective of the moving state of the vehicle (irrespective of whether the vehicle is executing turning movement or translational movement). As examined above, the driving set 550 changes the orientation thereof only when a slip occurs between any of the driving wheels and the ground. Therefore, it is understood that a slip occurs on any of the driving wheels when the rotation sensor 84 outputs an output signal and that magnitude of the slip is proportional to the rotating speed of the driving set 550.

Figure 18:
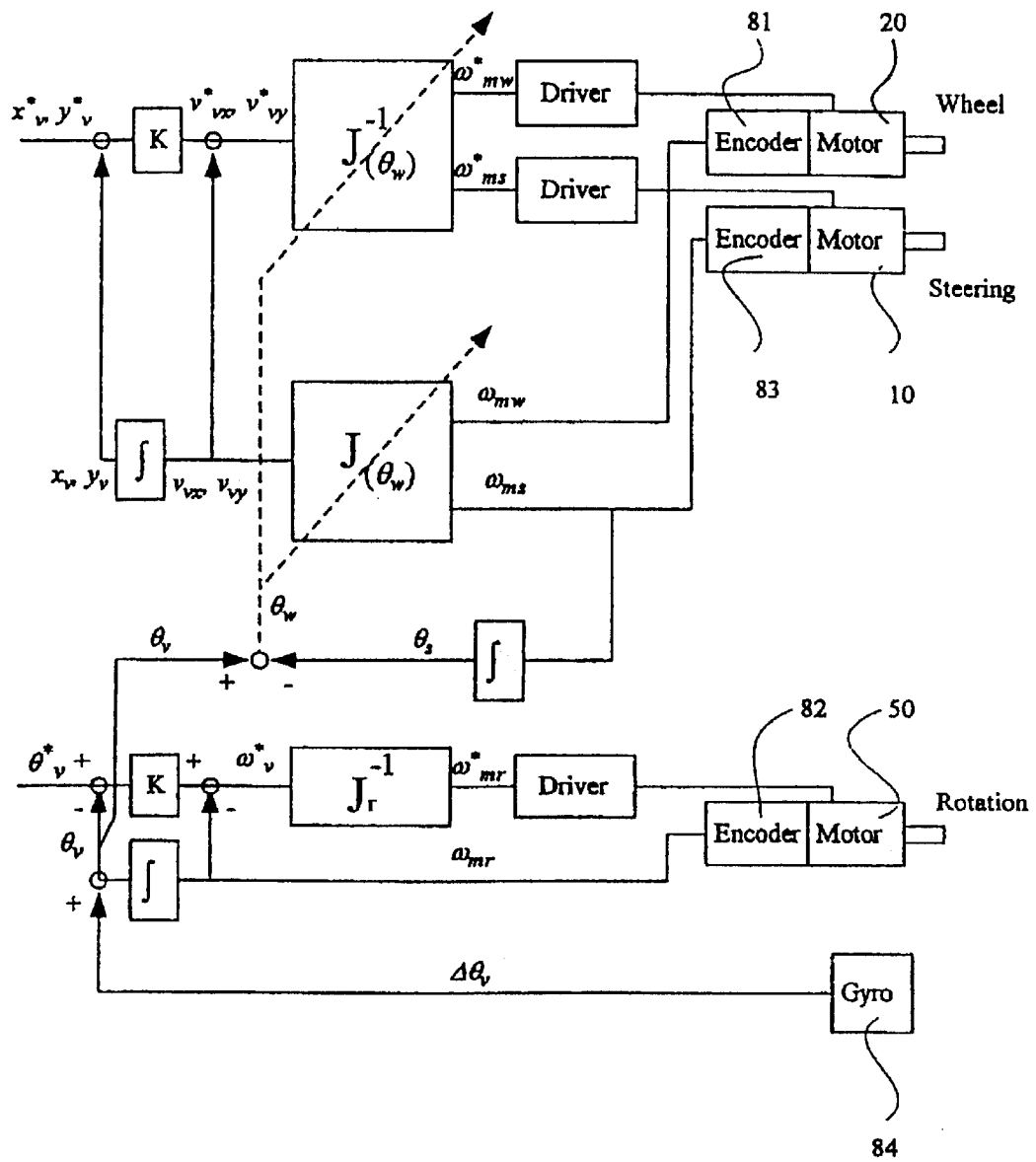
FIG. 18 is a block diagram of a control system for controlling the omnidirectional vehicle according to a thirteenth aspect of the invention.
Figure 19:
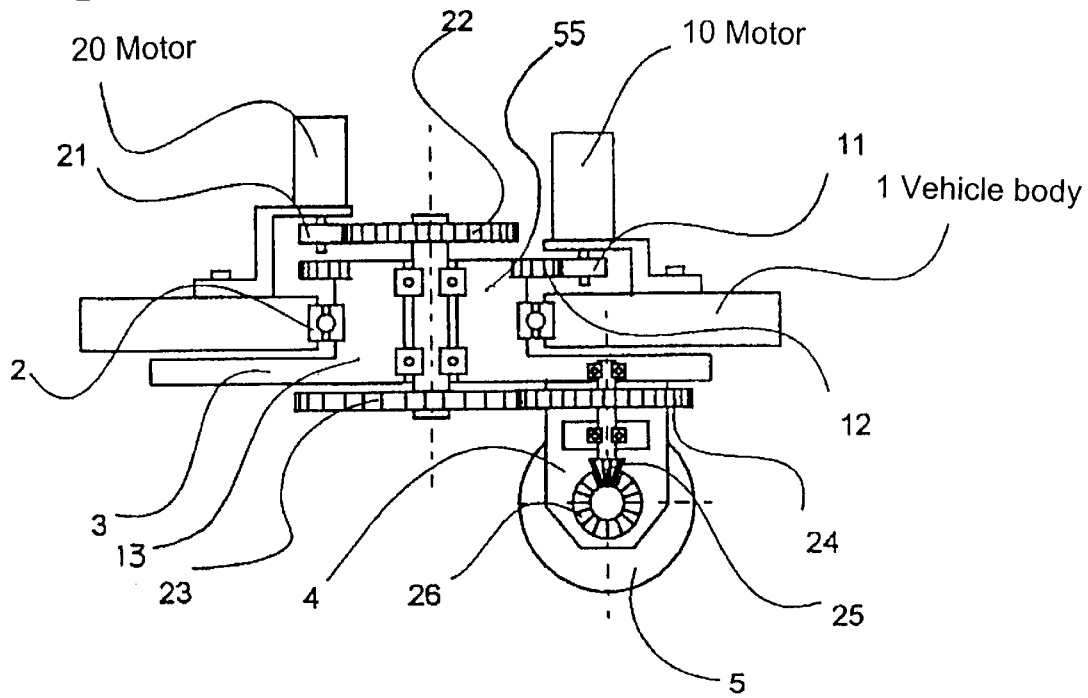
FIG. 19 is a side view of a conventional caster-type driving wheel mechanism, that is a modification of an omnidirectional vehicle according to an embodiment disclosed in Japanese Patent Unexamined Publication No. 9-164968.
Figure 20:
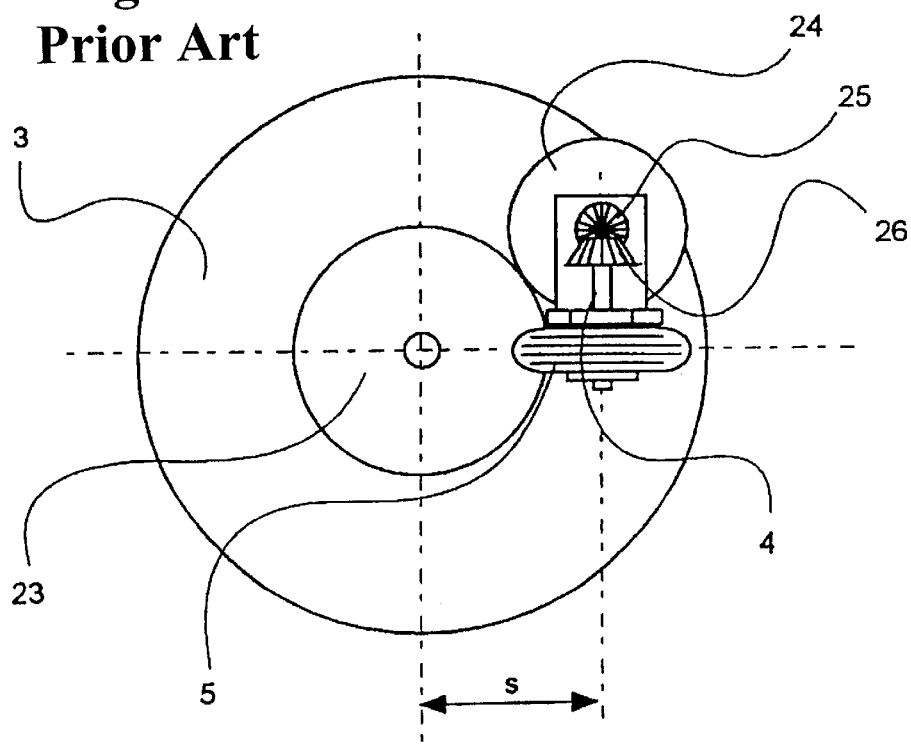
FIG. 20 is a plan view of the conventional caster-type driving wheel mechanism.
Figure 21:
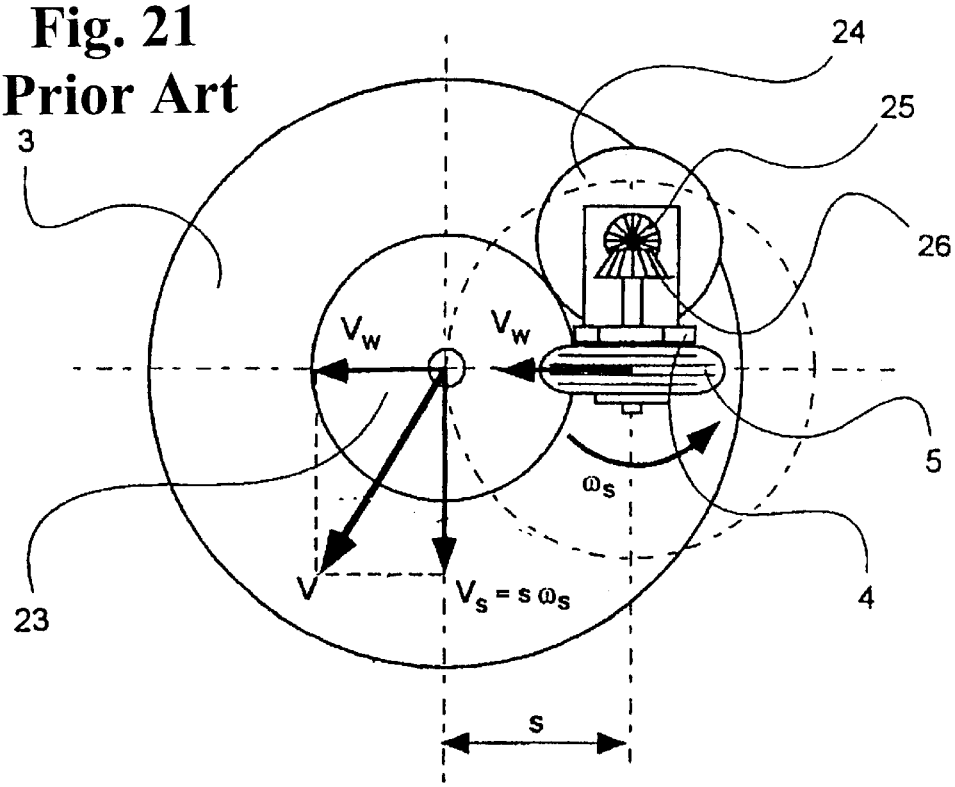
FIG. 21 is a velocity vector diagram on the conventional caster-type driving wheel mechanism.
Figure 22:
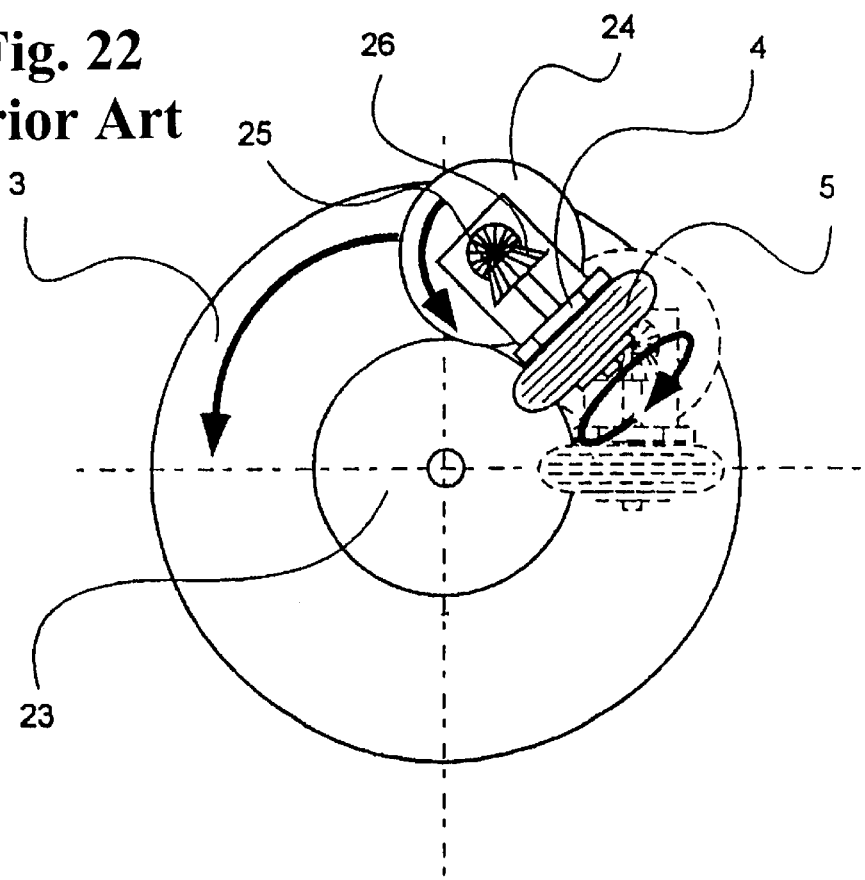
FIG. 22 is a plan view of the caster-type driving wheel mechanism for explaining the operation thereof.
Figure 23:
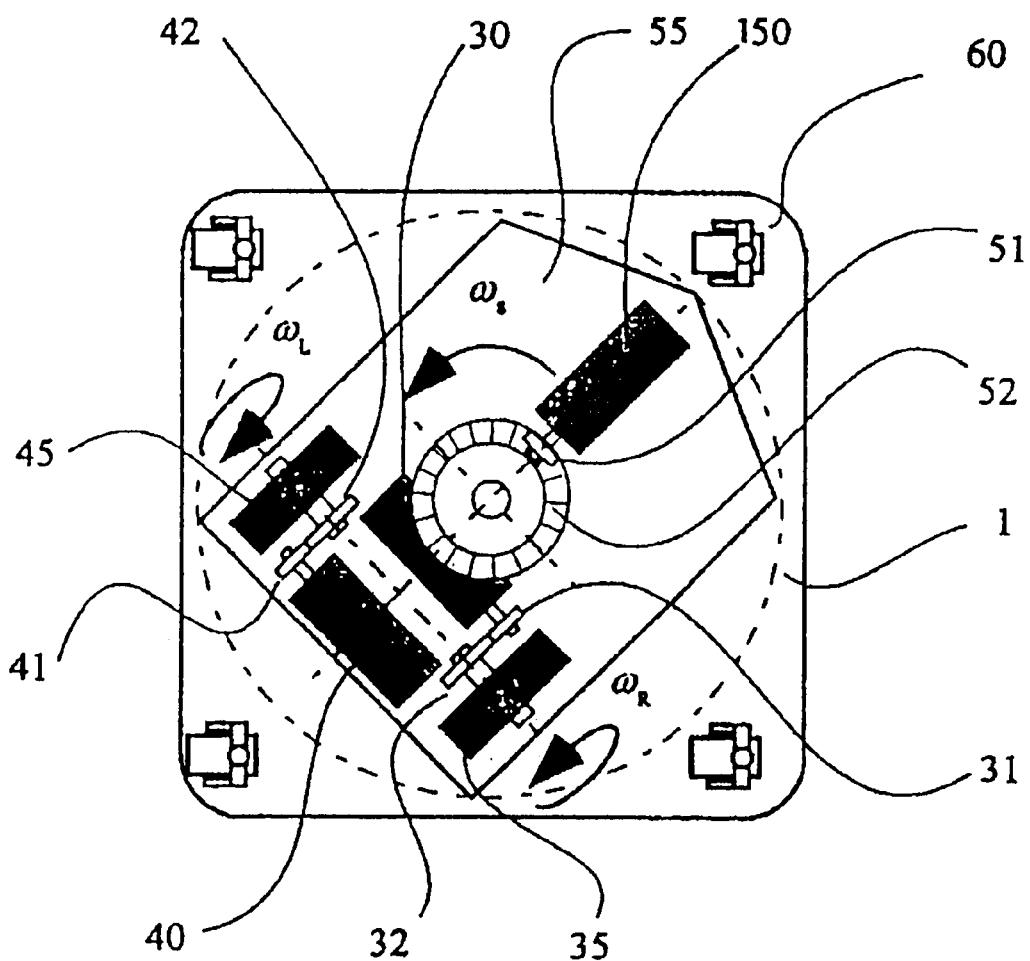
FIG. 23 is a plan view for schematically showing a holonomic omnidirectional vehicle according to another embodiment disclosed in Japanese Patent Unexamined Publication No. 9-164968.
Figure 24:
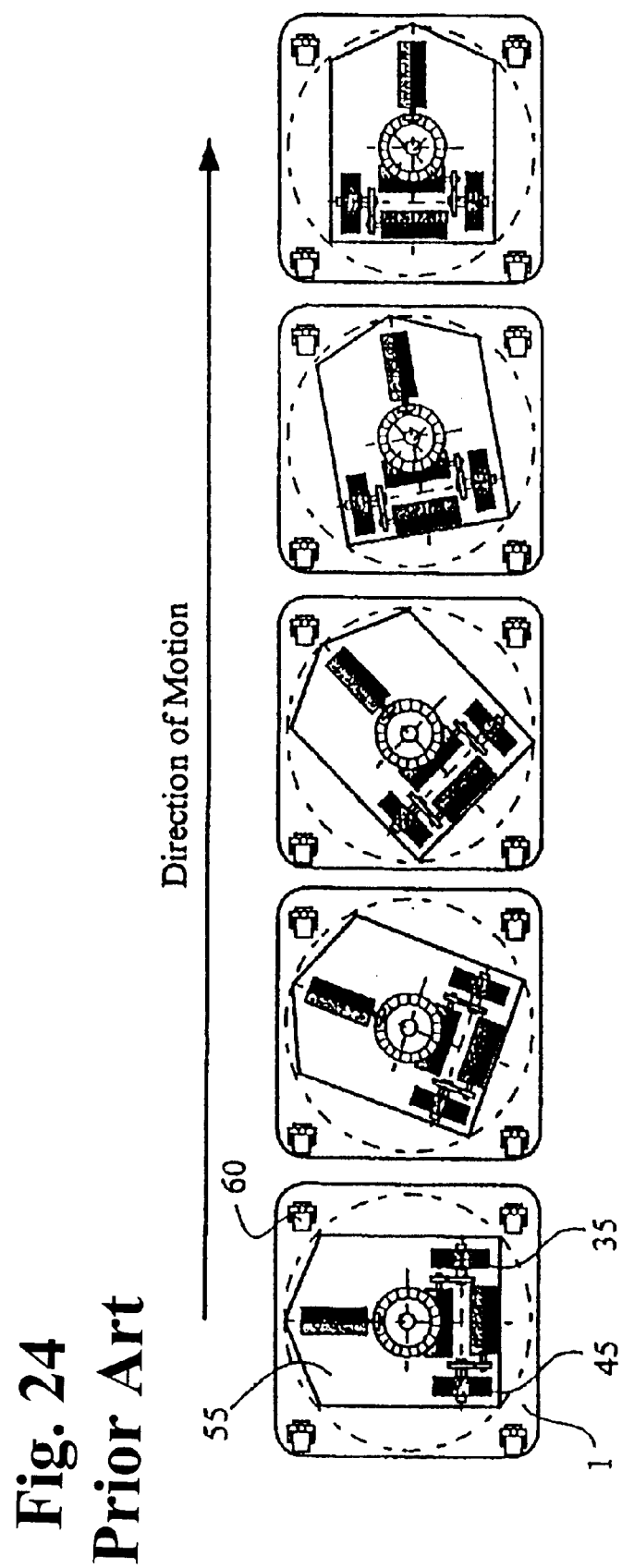
FIG. 24 shows plan views of the holonomic omnidirectional vehicle of FIG. 23 for explaining the operation thereof.

In FIG. 18, the symbol * on the right shoulder of the parameters indicates that the pertinent parameters designate the respective reference values. Referring now to FIG. 18, the estimated values of the actual position $x_v$ and $y_v$ and the actual velocity $v_{vx}$ and $v_{vy}$ are obtained by calculating the dynamic model $J(\theta_w)$ of the vehicle based on the angle data of the motors 10 and 20 fed from the encoders 83 and 81 mounted on the respective motors 10 and 20. The positional error is detected by comparing the 10 estimated position values with the reference position values $x_v^*$ and $y_v^*$ fed to the vehicle from a host controller or a operating unit (both not shown).

The detected positional error is treated as reference velocity values $v_{vx}^*$ and $v_{vy}^*$ and compared with the actual velocity values $v_{vx}$ and $v_{vy}$. The reference angular rotating velocities $\omega_{ms}^*$ and $\omega_{mw}^*$ of the motors 10 and 20 are determined by calculating the inverse dynamic model $J^{-1}(\theta_w)$ of the vehicle based on the velocity error obtained finally by the calculation of the feedback control described above. The motor 10 for driving the steering shaft and the motor 20 for driving the shafts of the driving wheels are controlled based on the reference angular rotating velocities of the motors 10 and 20.

The orientation of the vehicle is controlled by the motor 50 for turning the vehicle. The estimated value of the actual vehicle orientation is obtained by adding the rotation angle of the motor 50 to the initial value of orientation of the driving set 550. (In FIG. 18, the initial value of orientation of the driving set 550 is set to zero.) The orientation error of the vehicle is detected by comparing the estimated value of the actual vehicle orientation with the reference orientation value $\theta_v^*$ fed from the host controller or operating unit (both not shown). The detected orientation error is compared with the actual angular velocity $\theta_v$ measured by the encoder 82 mounted on the motor 50 for turning the vehicle. The reference angular rotating velocity $\omega_{mr}^*$ of the motor 50 is determined by calculating the inverse dynamic model $J_r^{-1}$ of the vehicle based on the result of the comparison described above. The motor 50 for turning the vehicle is controlled based on the reference angular rotating velocity determined as described above.

The motor 10 for driving the steering shaft and the motor 20 for driving the shafts of the driving wheels are controlled and driven in combination to control the movement of the vehicle in the traveling direction thereof. The motor 50 for turning the vehicle is controlled and driven independently to control the orientation of the body of the vehicle. The dynamic model $J(\theta_w)$ and the inverse dynamic model $J^{-1}(\theta_w)$ used to calculate the traveling movements are the functions of the direction $\theta_w$ of the driving wheels with respect to the vehicle. Since an angle error is caused between the direction of the reference trajectory on the ground and the actual running direction of the vehicle when the direction $\theta_w$ of the driving wheels is inaccurate, it is necessary to measure the direction $\theta_w$ of the driving wheels with respect to the vehicle accurately.

The direction $\theta_w$ of the driving wheels is obtained by subtracting the angle $\theta_s$ of the driving wheels with respect to the driving set 550 from the orientation $\theta_v$ of the body of the vehicle. The change of the angle $\theta_s$ of the driving wheels with respect to the driving set 550 is detected accurately by the encoder 83 mounted on the motor 10 for driving the steering shaft. Since the orientation $\theta_v$ of the body of the vehicle is calculated by adding the rotation $\theta_s$ of the motor for turning the vehicle to the initial orientation of the driving set 550, the calculated orientation $\theta_v$ of the body of the vehicle is different from the actual value when a deviation occurs between the actual orientation and the initial orientation of the driving set 550.

When a deviation occurs between the momentary orientation and the initial orientation of the driving set 550, the deviation is measurable with the rotation sensor 84. By adding the output $\Delta\theta_v$ of the rotation sensor 84 simply to the estimated orientation value, the orientation error from the initial orientation of the driving set 550 from the initial orientation thereof, i.e. the orientation $\Delta\theta_v$ of the driving set 550 with respect to the ground, is obtained. The orientation $\theta_v$ of the body of the vehicle and the angle $\theta_w$ of the driving wheels with respect to the body of the vehicle are corrected based on the obtained $\Delta\theta_v$. By replacing the dynamic model $J(\theta_w)$ and the inverse dynamic model $J^{-1}(\theta_w)$ used for calculating the translational movements to the newest ones (as illustrated by the broken lines in FIG. 18) at any time by using the accurately corrected angle $\theta_w$ of the driving wheels with respect to the body of the vehicle, it becomes possible to predict not only the turning movement but also to control the translational movement accurately with respect to the ground or to predict the actual position of the vehicle.

As described above, the method of controlling the omnidirectional vehicle according to the invention does not need any calculation for calculating the vehicle errors from various measured values, such as the rotation of the driving wheels and the steering angle, that the conventional system requires, and completes error correction easily in a very short time.

The omnidirectional vehicle or the control method thereof according to the invention facilitates removing the velocity interference between the actuators for driving the vehicle, simplifies the control system and reduces the capacities of the motors for driving the shafts of the driving wheels and for driving the steering shaft. The omnidirectional vehicle or the control method thereof according to the invention prevents the external torque turbulence exerted to the steering shaft from being transmitted to the actuator for driving the steering shaft, and facilitates reducing the capacity of the actuator for driving the steering shaft.

As a whole, a practical holonomic omnidirectional vehicle, that prevents interference in the control system and the driving system, simplifies the control system and the driving system, reduces the capacities of the actuators, reduces the electric power for driving the vehicle, reduces the manufacturing costs, and performs a high reliability and a very precise traveling capability, is obtained.

While the invention has been explained with reference to the specific embodiments of the invention, the explanation is illustrative and the invention is limited only by the appended claims.

What is claimed is:

1. An omnidirectional vehicle comprising:
   a body;
   at least one driving unit fixed to the body and including a steering shaft, a first actuator fixed to the body for driving the steering shaft, a driving wheel having a shaft, and a second actuator fixed to the body for driving the shaft of the driving wheel;
   a bearing fixed to the body for axially supporting the steering shaft;
   first power transmitting means for transmitting a power from the first actuator to the steering shaft to drive the steering shaft;
   second power transmitting means for transmitting a power from the second actuator to the driving wheel to thereby drive the driving wheel; and
   supporting means having a bearing and positioned below the steering shaft for axially supporting the driving wheel via the bearing to thereby rotate the driving wheel together with the steering shaft around a vertical axis of the body;
   wherein said driving wheel is positioned in a first plane including the shaft of the driving wheel which is perpendicular to a second plane including a rotation axis of the steering shaft, said driving wheel located in the first plane being spaced apart for a first predetermined distance (d) from the second plane, said first plane being spaced apart for a second predetermined distance (s) from the rotation axis of the steering shaft at a point intersecting the second plane to thereby freely rotate the driving wheel around a horizontal axis, and said shaft of the driving wheel and the steering shaft do not cross each other.

2. The omnidirectional vehicle according to claim 1, wherein said second power transmitting means comprises a first transmission section moved by the second actuator around a vertical axis independently of the steering shaft; and a second transmission section linked to said first transmission section and movable around a vertical axis together with said steering shaft, said second transmission section having a reduction gear ratio (G) and a relation with a radius (r) of the driving wheel and the first predetermined distance (d) as (d)=(r)/(G), said (G) of more than one indicating deceleration.

3. The omnidirectional vehicle according to claim 2, wherein said supporting means comprises a steering shaft connector connected and fixed to the steering shaft, a gear axially supported by the steering shaft connector, and a support link axially supported on the rotation axis of the gear rotatably in a vertical plane and axially supporting the driving wheel; said second transmission section including a gear for driving the driving wheel and being coupled to the gear supported by the steering shaft connector, said second transmission section being movable around a horizontal axis together with the steering shaft; and a vibration absorber situated between the steering shaft and the support link for absorbing vibrations caused while the driving wheel is running on a ground.

4. The omnidirectional vehicle according claim 3, wherein said vibration absorber comprises a spring; and said vehicle further comprises measuring means for measuring one of a total weight of the vehicle including a load and a center of gravity of the vehicle including a load, said measuring means comprising a linear position sensor disposed parallel to the spring and having a linear driving potentiometer, said linear position sensor measuring deformation of the spring to measure a vertical reactive force exerted to the driving wheel.

5. The omnidirectional vehicle according claim 3, further comprising a rotatable rod inserted through a center of the steering shaft to move up and down in response to a displacement of the vibration absorber which rotates in association with rotation of the steering shaft; and measuring means for measuring one of a total weight of the vehicle including a load, and a center of gravity of the vehicle including a load, said measuring means comprising a linear position sensor disposed in a portion of the vehicle not rotated by a movement of the steering shaft and having a linear driving potentiometer, said linear position sensor measuring a displacement of the rotatable rod to measure deformation of the vibration absorber.

6. A method of controlling an omnidirectional vehicle including a plurality of the driving units described in claim 1, said method comprising:
   defining vehicle-based-coordinates, an origin thereof being set at a reference point of the vehicle; and
   controlling an angular rotating velocity of said first actuator in each of the driving units and an angular rotating velocity of the second actuator in each of the driving units based on a following equation relating to position data of the steering shaft on each of the driving units on the vehicle-based-coordinates and orientation data of the driving units on the vehicle-based-coordinates;

$$\omega_{mwi}=(Gw/r)\{v_{vx}\cos\theta_{wi}+v_{vy}\sin\theta_{wi}+\omega_v(x_i\sin\theta_{wi}-y_i\cos\theta_{wi})\}$$

$$\omega_{msi}=(Gs/s)\{-v_x\sin\theta_{wi}+v_{vy}\cos\theta_{wi}+\omega_v(x_i\cos\theta_{wi}+y_i\sin\theta_{wi})\}$$

wherein $\omega_{mwi}$ is the angular rotating velocity of the actuator for driving the shaft of the driving wheel of the i-th driving unit;

$\omega_{msi}$ s the angular rotating velocity of the actuator for driving the steering shaft of the i-th driving unit;

$v_{vx}$ is the velocity of the vehicle along the x-axis;

$v_{vy}$ is the velocity of the vehicle along the y-axis;

$\omega_v$ is the angular rotating velocity of the vehicle around the reference point;

r is the radius of the driving wheel;

s is the horizontal distance between the steering shaft and the shaft of the driving wheel in the traveling direction of the driving wheel;

$x_i$ is the x-axis of coordinate on the vehicle-based coordinates of the location of the steering shaft in the i-th driving unit;

$y_i$ is the y-axis of coordinate on the vehicle-based coordinates of the location of the steering shaft in the i-th driving unit;

$\theta_{wi}$ is the orientation of the driving wheel in the i-th driving unit on the vehicle-based coordinates;

Gs is the reduction gear ratio of the power transmitting means of the actuator for driving the steering shaft; and Gw is the reduction gear ratio of the power transmitting means of the actuator for driving the shaft of the driving wheel.

7. An omnidirectional vehicle comprising:

a body having a vertical axis;

a driving set mounted on the body and including a plurality of driving units, each having a steering shaft and a driving wheel having a shaft;

first power transmitting means including one of a belt and a chain;

second power transmitting means;

a first actuator for driving the steering shafts of the driving units collectively via the first power transmitting means;

a second actuator for driving the driving wheels of the driving units via the second power transmitting means;

a bearing mounted on the driving set for rotatably supporting the body around the vertical axis;

a third actuator mounted on the driving set for rotating the body around the vertical axis;

third power transmitting means mounted on the driving set for transmitting power from the third actuator; and supporting means positioned below the steering shafts for axially supporting the driving wheels via bearings;

wherein each of said driving wheel is positioned in a first plane including the shaft of the driving wheel which is perpendicular to a second plane including a rotation axis of the steering shaft, said driving wheel located in the first plane being spaced apart for a first predetermined distance (d) from the second plane, said first plane being spaced apart for a second predetermined distance (s) from the rotation axis of the steering shaft at a point intersecting the second plane to thereby freely rotate the driving wheel around a horizontal axis, and said shaft of the driving wheel and the steering shaft do not cross each other.

8. The omnidirectional vehicle according to claim 7, wherein a relative positional relation between the driving wheel and the steering shaft in one driving unit is opposite to a relative positional relation between the driving wheel and the steering shaft in an adjacent driving unit to relax an interference caused by external torque turbulence between the driving wheels and a ground on which the vehicle is running.

9. A method of controlling the omnidirectional vehicle as described in claim 7, said method comprising:

controlling an angular rotating velocity of the first actuator, an angular rotating velocity of the second actuator, and an angular rotating velocity of the third actuator based on following equations to control directions and velocities of the translational movements of the driving units and the body, and an orientation of the body:

$$\omega_{mw}=(Gw/r)(v_{vx} \cos \theta_w + v_{vy} \sin \theta_w)$$

$$\omega_{ms}=(Gs/s)(-v_{vx} \sin \theta_w + v_{vy} \cos \theta_w)$$

$$\omega_{mr}=G_r\omega_v$$

wherein $v_{vx}$ is the velocity of the vehicle along the x-axis;

$v_{vy}$ is the velocity of the vehicle along the y-axis;

$\omega_v$ is the angular rotating velocity of the vehicle around the reference point;

$\omega_{mw}$ is the angular rotating velocity of the actuator for driving the shafts of the driving wheels;

$\omega_{ms}$ is the angular rotating velocity of the actuator for driving the steering shafts;

$\omega_{mr}$ is the angular rotating velocity of the actuator for driving the turning shaft of the vehicle;

r is the radius of the driving wheel;

s is the horizontal distance between the steering shaft and the driving wheel in the traveling direction of the driving wheel;

$\theta_w$ is the orientation of the driving wheels on the vehicle-based coordinates;

Gs is the reduction gear ratio of the power transmitting means of the actuator for driving the steering shafts;

Gw is the reduction gear ratio of the power transmitting means of the actuator for driving the shafts of the driving wheels; and $G_r$ is the reduction gear ratio of the power transmitting means of the actuator for driving the turning shaft of the vehicle.

10. The method according to claim 8, wherein said $\theta_w$ is measured by angle measuring means comprising an angle detector fixed to the body of the vehicle and a shaft, said shaft of the angle detector being rotated by the first power transmitting means of the first actuator for driving the steering shafts.

11. The method according to claim 9, wherein said angle measuring means comprises:

a first integrating encoder for detecting a rotation of a shaft of the first actuator;

a second integrating encoder for detecting a rotation of a shaft of the third actuator;

an absolute encoder for detecting an orientation of the driving wheel with respect to the body; and a differential counter for counting a number of pulses contained in a first pulse train from said first integrating encoder and a number of pulses contained in a second pulse train from the second integrating encoder;

wherein said first pulse train indicates a normal rotation or a reverse rotation of the first actuator, and is inputted to a positive input of the differential counter; said second pulse train indicates a normal rotation or a reverse rotation of the second actuator, and is inputted to a negative input of the differential counter; said differential counter subtracts the number of pulses contained in the second pulse train from the number of pulses contained in the first pulse train, and outputs a result of the subtraction; and said angle measuring means uses an output of the differential counter for lower place bits and an output of the absolute encoder for upper place bits, and connects said lower place bits and said upper place bits to obtain a relative angle value between the orientation of the vehicle and the driving wheel.

12. The method according to claim 9, further comprising:

detecting a slip between the driving wheels and a ground based on an output of a sensor disposed on the driving set, said sensor detecting a rotation around the vertical axis of the vehicle, and having a gyroscope; and correcting a measured relative angle value between the orientations of the driving wheels and the body of the vehicle based on a detected slip value.

13. The method according to claim 9, further comprising:

detecting a rotation angle around the vertical axis of the vehicle by a sensor disposed on the body of the vehicle having a gyroscope; and adding a detected rotation angle to data of the orientation of the body of the vehicle to correct stored data of the orientation of the body of the vehicle.

\* \* \* \* \*

UNITED STATES PATENT AND TRADEMARK OFFICE
CERTIFICATE OF CORRECTION

PATENT NO. : 6,408,230 B2
DATED : June 18, 2002
INVENTOR(S) : Masayoshi Wada

It is certified that error appears in the above-identified patent and that said Letters Patent is hereby corrected as shown below:

Column 3,
Line 42, change "13" to -- 5 --;
Line 47, change "VS" to -- Vs --;

Column 7,
Line 3, change "vehicle-basedcoordinates" to -- vehicle-based-coordinates --;
Line 40, change "mare" to -- more --;

Column 8,
Line 9, (in the equation), change "$\omega_s$" to -- $\omega_{mw}$ --;
Line 10, (in the equation), change "$\omega_s$" to -- $\omega_{ms}$ --;

Column 9,
Line 30, change "an" to -- can --;

Column 12,
Line 19, change "vs" to -- $v_s$ --;

Column 13,
Line 10, change "aspect" to -- aspects --;
Line 13, change "figure" to -- figures --;
Line 15, change "embodiments" to -- embodiment --;

Column 14,
Line 30, after "$y_i$" add a period;
Line 44, change "iv" to -- $\omega_v$ --;
First line in equations (9), change "$V_{ix}$" to -- $v_{ix}$ --;
First and second lines in equations (10), change "$L_i i$" to -- $L_i$ --, respectively;
Second lines in equations (11), change "$v_{iy} = -\omega_y x_i$ (i=1,2…)" to -- $v_{iy} = \omega_v x_i$ (i=1,2…) --;

Column 15,
Equations (12), change "$v_{ix} = v_{vy} + \omega_v Y_i$ (i=1,2…)" (first occurrence) to -- $v_{ix} = v_{vx} - \omega_v y_i$ (i = 1,2…) --, and change "$v_{ix} = v_{vy} + \omega_v Y_i$ (i=1,2…)" (second occurrence) to -- $v_{iy} = v_{vy} + \omega_v x_i$ (i=1,2…) --;
Second line in equations (13), change "$V_{vy} \sin\theta_{wi}$" to -- $v_{vy} \sin\theta_{wi}$ --;
First line in equations (14), change "$Y_i \cos\theta_{wi}$" to -- $y_i \cos\theta_{wi}$ --;

UNITED STATES PATENT AND TRADEMARK OFFICE
CERTIFICATE OF CORRECTION

PATENT NO. : 6,408,230 B2
DATED : June 18, 2002
INVENTOR(S) : Masayoshi Wada

It is certified that error appears in the above-identified patent and that said Letters Patent is hereby corrected as shown below:

Column 17,
Line 20, change "$V_{vy}$" to -- $v_{vy}$ --;
First line in equations (16), change "$\omega_w$" to -- $\omega_{mw}$ --;
Second line in equations (16), change "$\omega_s$" to -- $\omega_{ms}$ --;
Third line in equations (16), change "$\omega_r$" to -- $\omega_{mr}$ --;

Column 18,
Line 3, change "$\omega_r$" to -- $\omega_{mr}$ --;
Line 51, change "pint" to -- point --;

Column 19,
Line 15, change "encodes 80 and 81" to -- encoders 81 and 82 --;
Line 20, change "encoder" to -- counter --;

Column 20,
Line 40, change "pulls" to -- pull --;

Column 21,
Line 55, delete "10";
Line 57, change "or a" to -- or an --;

Column 24,
Line 61, (in the equation), change "$\omega_{msi} = (Gs/s) \{-_{vx}\sin\theta_{wi} + v_{vy}\cos\theta_{wi} + \omega_v(x_i\cos\theta_{wi} + y_i\sin\theta_{wi})\}$" to -- $\omega_{msi} = (Gs/s) \{-v_{vx}\sin\theta_{wi} + v_{vy}\cos\theta_{wi} + \omega_v(x_i\cos\theta_{wi} + y_i\sin\theta_{wi})\}$ --;
Line 66, change "$\omega_{msi}$ s" to -- $\omega_{msi}$ is --.

Signed and Sealed this

Eighth Day of October, 2002

*Attest:*

*Attesting Officer*

JAMES E. ROGAN
*Director of the United States Patent and Trademark Office*